(12) United States Patent
Lin et al.

(10) Patent No.: US 10,771,791 B2
(45) Date of Patent: Sep. 8, 2020

(54) VIEW-INDEPENDENT DECODING FOR OMNIDIRECTIONAL VIDEO

(71) Applicant: MediaTek Inc., Hsinchu (TW)

(72) Inventors: Jian-Liang Lin, Yilan County (TW); Hung-Chih Lin, Nantou County (TW); Shen-Kai Chang, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 218 days.

(21) Appl. No.: 15/671,070

(22) Filed: Aug. 7, 2017

(65) Prior Publication Data

US 2018/0041764 A1 Feb. 8, 2018

Related U.S. Application Data

(60) Provisional application No. 62/371,878, filed on Aug. 8, 2016.

(51) Int. Cl.
| | |
|---|---|
| *H04N 19/174* | (2014.01) |
| *H04N 19/426* | (2014.01) |
| *H04N 5/232* | (2006.01) |
| *H04N 19/176* | (2014.01) |
| *G06T 11/60* | (2006.01) |
| *H04N 19/105* | (2014.01) |
| *H04N 19/597* | (2014.01) |
| *H04N 19/46* | (2014.01) |
| *H04N 19/30* | (2014.01) |
| *H04N 19/52* | (2014.01) |
| *H04N 19/70* | (2014.01) |

(52) U.S. Cl.
CPC ............ *H04N 19/174* (2014.11); *G06T 11/60* (2013.01); *H04N 5/23238* (2013.01); *H04N 19/105* (2014.11); *H04N 19/176* (2014.11); *H04N 19/30* (2014.11); *H04N 19/426* (2014.11); *H04N 19/46* (2014.11); *H04N 19/52* (2014.11); *H04N 19/597* (2014.11); *G06T 2207/20021* (2013.01); *G06T 2207/20108* (2013.01); *H04N 19/70* (2014.11)

(58) Field of Classification Search
None
See application file for complete search history.

(56) References Cited

U.S. PATENT DOCUMENTS

| | | | | |
|---|---|---|---|---|
| 4,424,587 A | * | 1/1984 | Wevelsiep | G06K 9/2054 382/289 |
| 6,084,979 A | * | 7/2000 | Kanade | H04N 13/243 382/154 |

(Continued)

OTHER PUBLICATIONS

Taiwan Intellectual Property Office, Office Action for Taiwan Patent Application No. 107127433, dated Mar. 29, 2019.

*Primary Examiner* — Tsung Yin Tsai

(74) *Attorney, Agent, or Firm* — Han IP PLLC; Andy M. Han

(57) ABSTRACT

For omnidirectional video such as 360-degree Virtual Reality (360VR) video, a video system that support independent decoding of different views of the omnidirectional video is provided. A decoder for such a system can extract a specified part of a bitstream to decode a desired perspective/face/view of an omnidirectional image without decoding the entire image while suffering minimal or no loss in coding efficiency.

10 Claims, 18 Drawing Sheets

(56) References Cited

U.S. PATENT DOCUMENTS

| | | | | |
|---|---|---|---|---|
| 2004/0086186 | A1* | 5/2004 | Kyusojin | H04N 7/181 382/232 |
| 2006/0008176 | A1* | 1/2006 | Igari | H04N 1/3876 382/284 |
| 2008/0152215 | A1* | 6/2008 | Horie | H04N 19/597 382/154 |
| 2013/0016771 | A1* | 1/2013 | Misra | H04N 19/176 375/240.03 |
| 2014/0193034 | A1* | 7/2014 | Oami | G06K 9/3233 382/103 |
| 2015/0016504 | A1* | 1/2015 | Auyeung | H04N 19/162 375/240.02 |
| 2016/0142697 | A1* | 5/2016 | Budagavi | H04N 13/156 348/43 |
| 2017/0323423 | A1* | 11/2017 | Lin | G06T 3/0062 |
| 2018/0035134 | A1* | 2/2018 | Pang | H04N 5/2258 |
| 2018/0376126 | A1* | 12/2018 | Hannuksela | H04N 19/30 |
| 2019/0289312 | A1* | 9/2019 | Kim | H04N 19/182 |

* cited by examiner

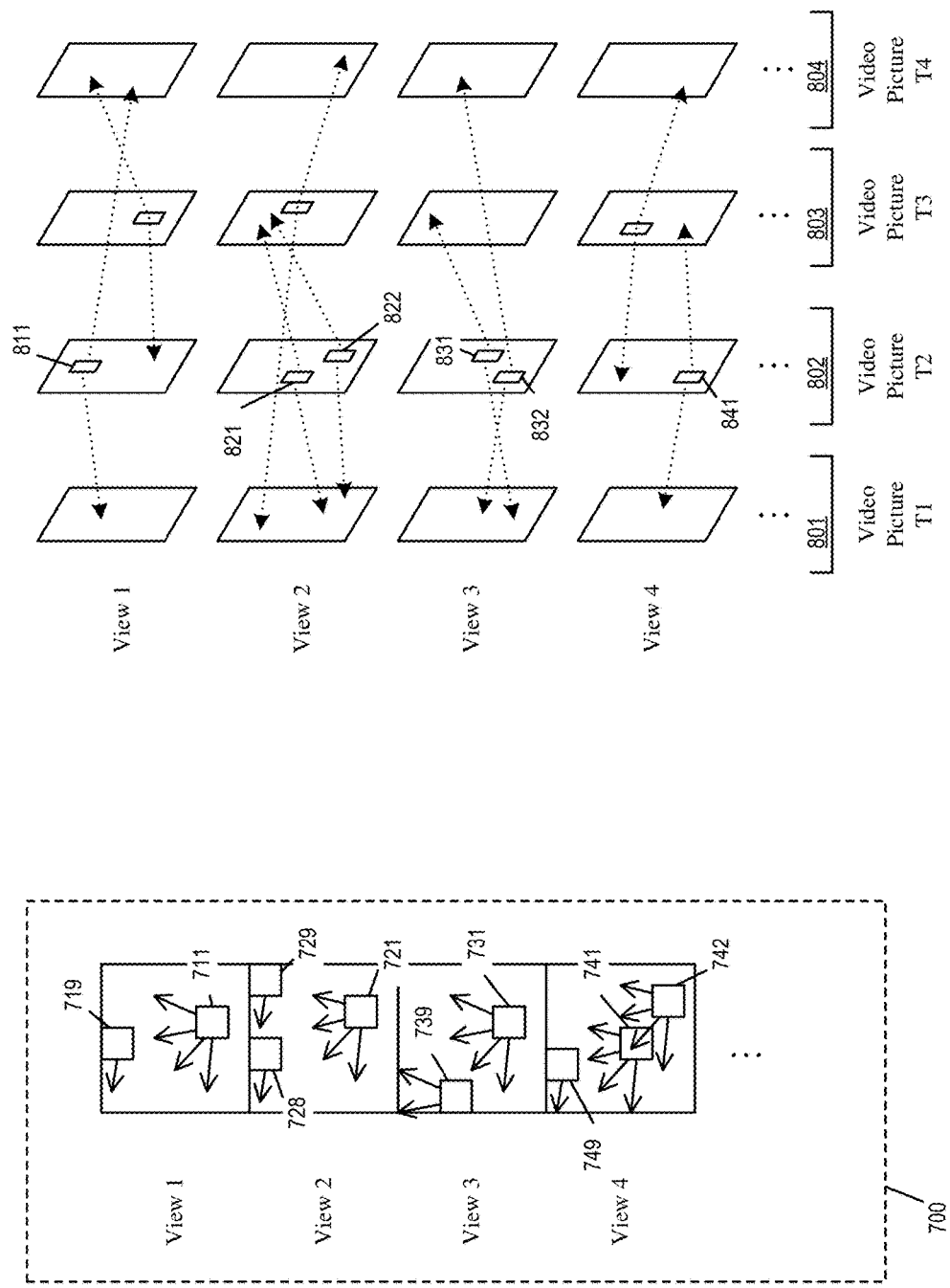

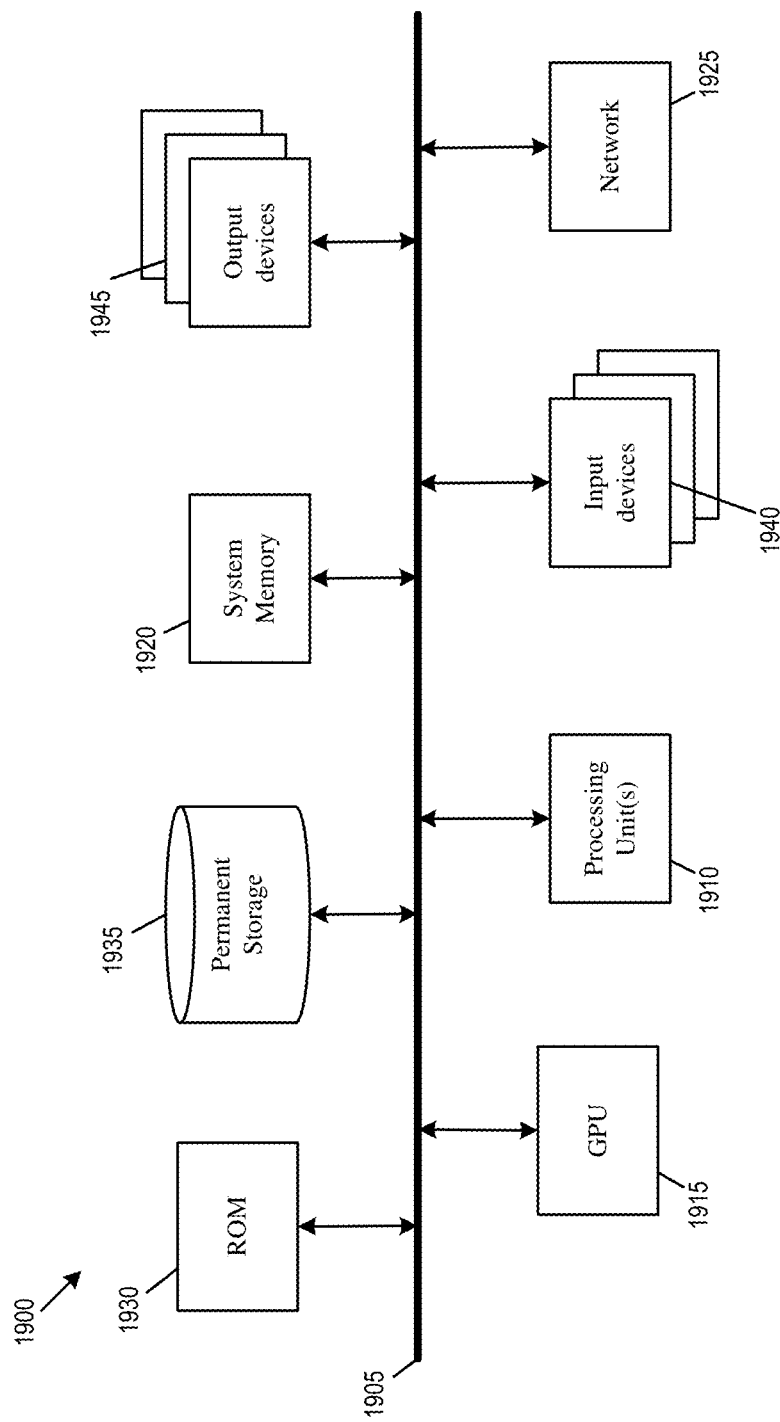

VIEW-INDEPENDENT DECODING FOR OMNIDIRECTIONAL VIDEO

CROSS REFERENCE TO RELATED PATENT APPLICATION(S)

The present disclosure claims the priority benefit of U.S. Provisional Patent Application No. 62/371,878, filed on 8 Aug. 2016, the content of which is incorporated by reference in its entirety.

TECHNICAL FIELD

The present disclosure relates generally to video processing. In particular, the present disclosure relates to methods and systems that allow different views of an omnidirectional video to be independently coded.

BACKGROUND

Unless otherwise indicated herein, approaches described in this section are not prior art to the claims listed below and are not admitted as prior art by inclusion in this section.

360-degree virtual reality (360VR) is an audiovisual simulation of an altered, augmented, or substituted environment. The visual reality video surrounds the user, allowing the user to look around in any direction or at any arbitrary view angle, just as he or she can in real life. 360VR videos produce exceptional high-quality and high-resolution panoramic videos for use in print and panoramic virtual tour production for a variety of applications, such as entertainment, pilot training, surgery, and exploration in space or deep water.

Three-dimensional (3D) television has been a technology trend in recent years that intends to bring viewers sensational viewing experience. Various technologies have been developed to enable 3D viewing. Multi-view video is a key technology for 3D TV application among others. The video maybe a two-dimensional (2D) medium that only provides viewers a single view of a scene from the perspective of the camera. The multi-view video is capable of offering arbitrary viewpoints of dynamic scenes and provides viewers the sensation of realism. 3D video formats may also include depth maps associated with corresponding texture pictures. The depth maps can also be coded to render three-dimensional view or multi-view.

As an extension of High Efficiency Video Coding (HEVC) and a next generation 3D video coding standard, the standardization of 3D-HEVC video coding standard was formally launched by the Joint Collaborative Team on 3D Video Coding Extension Development (JCT-3V) In order to support the auto-stereoscopic multi-view display more practically, multi-view video plus depth format was introduced as a new 3D video format for 3D-HEVC.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

For omnidirectional video such as 360-degree Virtual Reality (360VR) video, some embodiments of the disclosure provide a system that support independent decoding of different views of the omnidirectional video. A decoder for such a system can extract a specified part of a bitstream to decode a desired perspective/face/view of an omnidirectional image without decoding the entire image while suffering minimal or no loss in coding efficiency.

In some embodiments, a video encoder receives a sequence of omnidirectional images. Each omnidirectional image has a plurality of views. The video encoder encodes the sequence of omnidirectional images into a bitstream. Each view has a corresponding set of view-specific data in the bitstream for decoding the view. Each set of view-specific data is capable of being decoded independently from view-specific data of other views.

In some embodiments, a video decoder receives a bitstream that includes an encoded sequence of omnidirectional images. Each omnidirectional image has a plurality of views. Each view has a set of view-specific data for decoding the view. The video decoder receives a selection of a view. For an omnidirectional image in the sequence, the video decoder decodes the set of view-specific data of the selected view of the omnidirectional image. The view-specific data of at least one other view is not decoded. The video decoder then provides the selected view of the omnidirectional image based on the decoded set of view-specific data for display.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 7 illustrates intra-prediction coded pixel blocks that are constrained to reference pixels within the same view of the video picture.

FIG. 8 illustrates inter-prediction coded pixel blocks that are constrained to reference pixels of the same view.

FIG. 19 conceptually illustrates an electronic system in which some embodiments of the present disclosure may be implemented.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

For omnidirectional video such as 360-degree Virtual Reality (360VR) video, some embodiments of the disclosure provide a system that support independent decoding of different views of the omnidirectional video. A decoder for such a system can extract a specified part of a bitstream to decode a desired perspective/face/view of an omnidirectional image without decoding the entire image and without loss of coding efficiency.

Figure 1A:
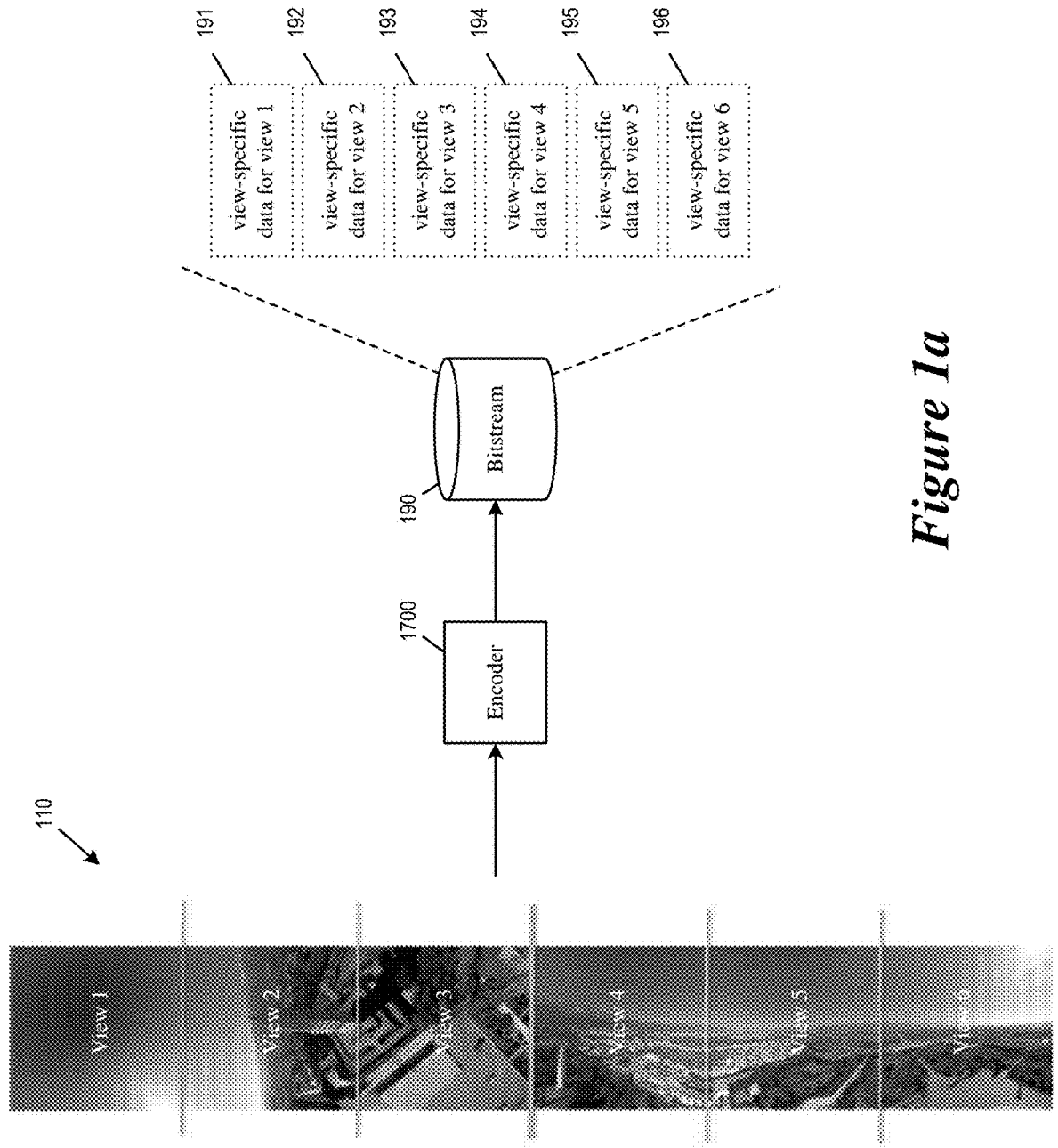
FIGS. 1a-b conceptually illustrate video coding systems that support independent decoding of different views in omnidirectional video.
Figure 1B:
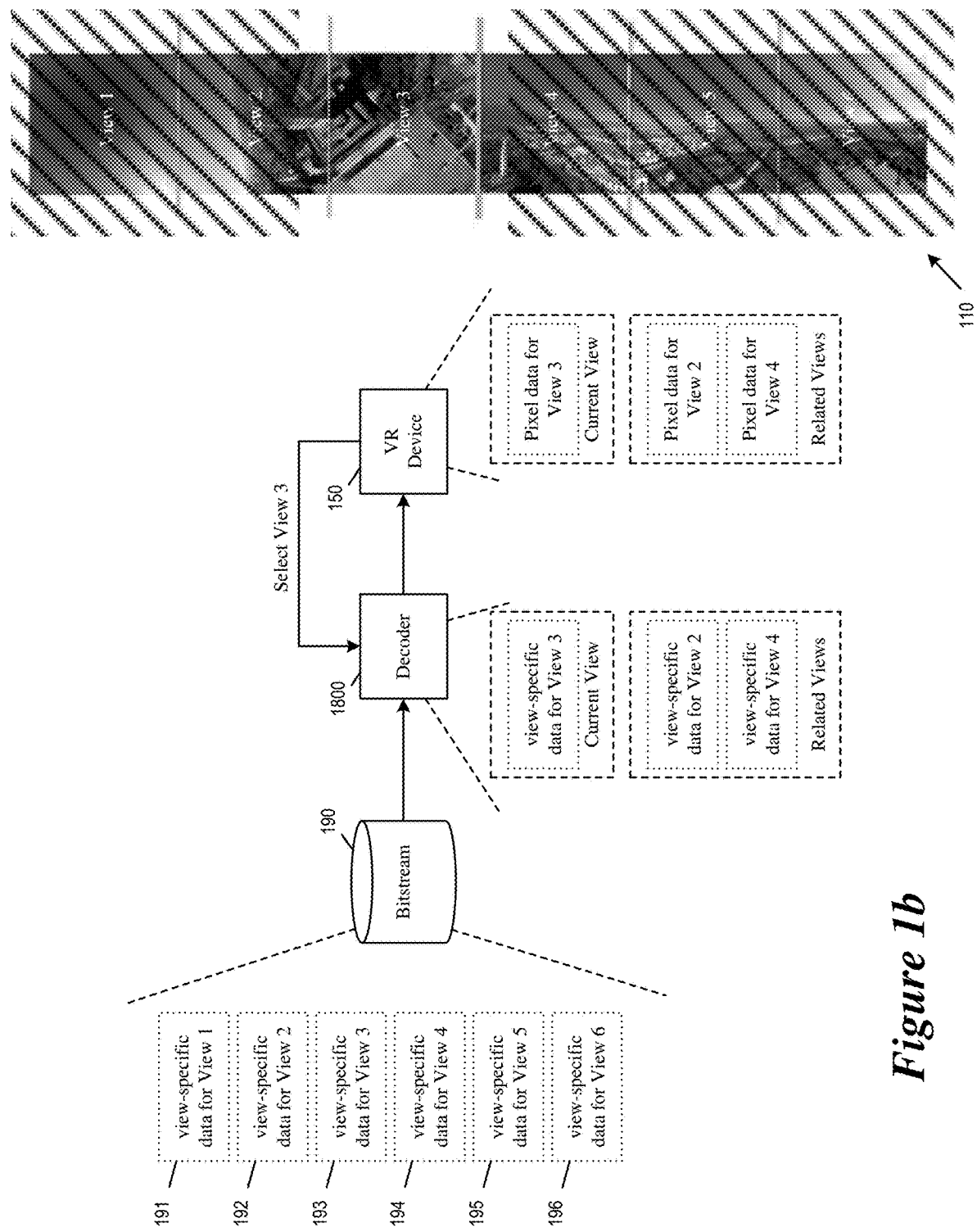

FIGS. 1a-b conceptually illustrate video coding systems that support independent decoding of different views in omnidirectional video. In some embodiments, the omnidirectional video coding systems includes video encoder system and/or video decoder system that encode video images or decode bitstreams that are compliant with a video-coding standard such as Advanced Video Coding (H.264 AVC) or High Efficiency Video Coding (H.265 HEVC). The video-coding standard may specify syntax elements for supporting omnidirectional video.

FIG. 1a illustrates a video encoder 1700 that encodes an omnidirectional video as a bitstream that allows independent decoding of different views. As illustrated, the video encoder 1700 receives an omnidirectional video 110 having omnidirectional images, encodes the omnidirectional video 110 and produces a bitstream 190.

The omnidirectional video 110 has six views/faces/perspectives (henceforth referred to as views). The different views of the omnidirectional video 110 are encoded into different parts of the bitstream 190. In this example, views 1 through 6 of the omnidirectional video are encoded into different sets of view-specific data (view-specific data 191-196 for views 1 through 6, respectively). A set of view-specific data of a given view contains encoded information for reconstructing a portion of an image (or portions of images) that corresponds to the given view. A set of view-specific data for a view does not refer to view-specific data of another view for reconstructing the pixels of the image and does not depend on view-specific data of another view for extraction (e.g., entropy decoding) from the bitstream 190.

FIG. 1b illustrates a video decoder 1800 that performs independent decoding of a selected view in an omnidirectional video. As illustrated, the video decoder 1800 receives and decodes the bitstream 190 to reconstruct the omnidirectional video 110. The video decoder 1800 provides the reconstructed omnidirectional video to a virtual reality (VR) device 150 for display. An example of the VR-device 150 is a VR goggle. In some embodiments, the VR-device is an electronic apparatus that may include the decoder 1800, a display, and a user interface device or circuit for receiving input from user. In some embodiments, the decoder 1800 is external to the VR-device 150, and the VR-device includes an input interface for receiving decoded image/video from the decoder 1800.

The user of the VR-device 150 may view only one of the six views of the omnidirectional video 110, and the VR device 150 (or the user interface circuit or device within the VR device) selects a view of the omnidirectional video 110 as the current view for display. The VR-device 150 relays the selection of the current view to the video decoder 1800, and the decoder 1800 decodes only the view-specific data of the current view and delivers the pixels of the current view to the VR-device 150. The view-specific data of the other views are not decoded. In the illustrated example, the VR-device 150 selects View 3 as the current view, and the decoder decodes the view-specific data of view 3. The view-specific data of views 1, 2, 4, 5 and 6 are not decoded. Thus, only the pixels of view 3 is reconstructed and provided to the VR-device 150.

In some embodiments, the VR-device 150 may display parts of other views that are related (e.g., adjacent or neighboring) to the current view. In these instances, the VR-device 150 selects the views to be displayed, and the decoder 1800 decodes the view-specific data of the related views in addition to that of the current view. In the example illustrated, the VR-device 150 displays parts of views 2 and 4 because they are adjacent to view 3. The decoder correspondingly decodes the view-specific data of views 2 and 4 in additional to view 3. The view-specific data of views 1, 5, and 6 are not decoded. In some embodiments, the VR-device relays the selection of multiple views to the decoder 1800, and the decoder would decode the view-specific data of the selected multiple views without decoding non-selected views.

Figures 2, 3:
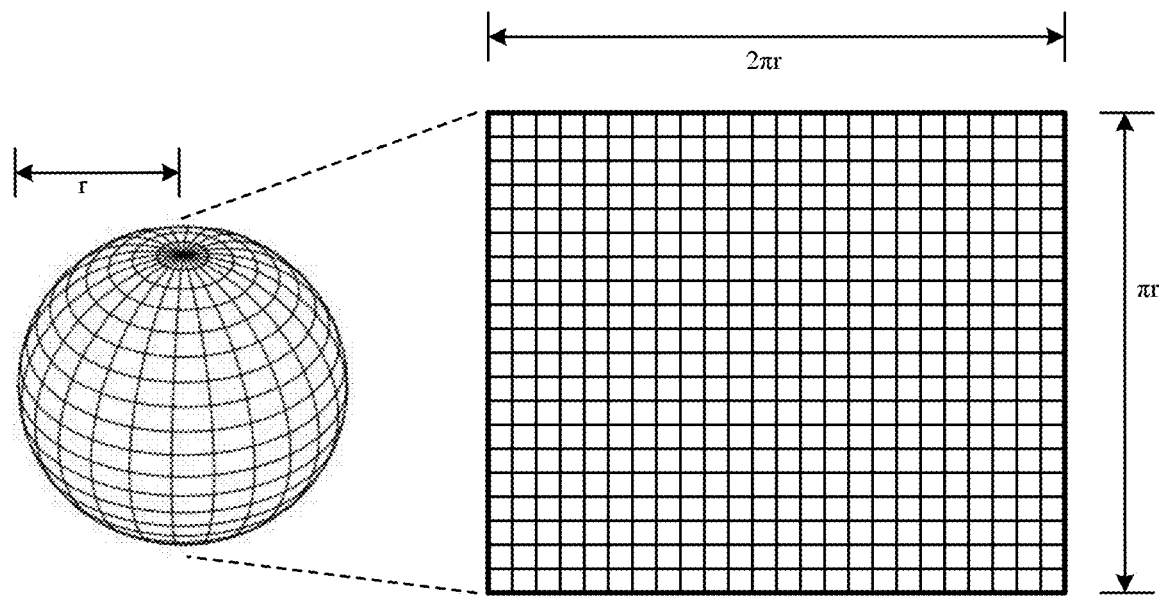
FIG. 2 illustrates an omnidirectional image that is based on an equirectangular projection of a sphere.
FIG. 3 illustrates various omnidirectional images that are projections of different types of platonic solids.

In some embodiments, the omnidirectional video 110 is a 360VR video having a sequence of omnidirectional images. Each omnidirectional image is divided into multiple views. The omnidirectional image may be the projection of the surface areas of different types of geometric shapes. FIG. 2 illustrates an omnidirectional image that is based on an equirectangular projection of a sphere. FIG. 3 illustrates various omnidirectional images that are projections of different types of platonic solids, including cube (6 faces), tetrahedron (4 faces), octahedron (8 faces), dodecahedron (12 faces), or icosahedron (20 faces). The figure also includes their area ratio compared to a spherical projection and an equirectangular projection (ERP).

In the example illustrated in FIGS. 1a-b, each image of the omnidirectional video 110 is an omnidirectional image having six views that corresponds to the six faces of a cube. The six views (or the six cubic faces) of the omnidirectional image are arranged in a 6×1 (1 column) formation. For some embodiments, an omnidirectional image whose views correspond to different faces of a cube may have other types of arrangement, such as 1×6 (1 row), 2×3, 3×2, or 3×4 (unfolding box) formation.

Figure 4:
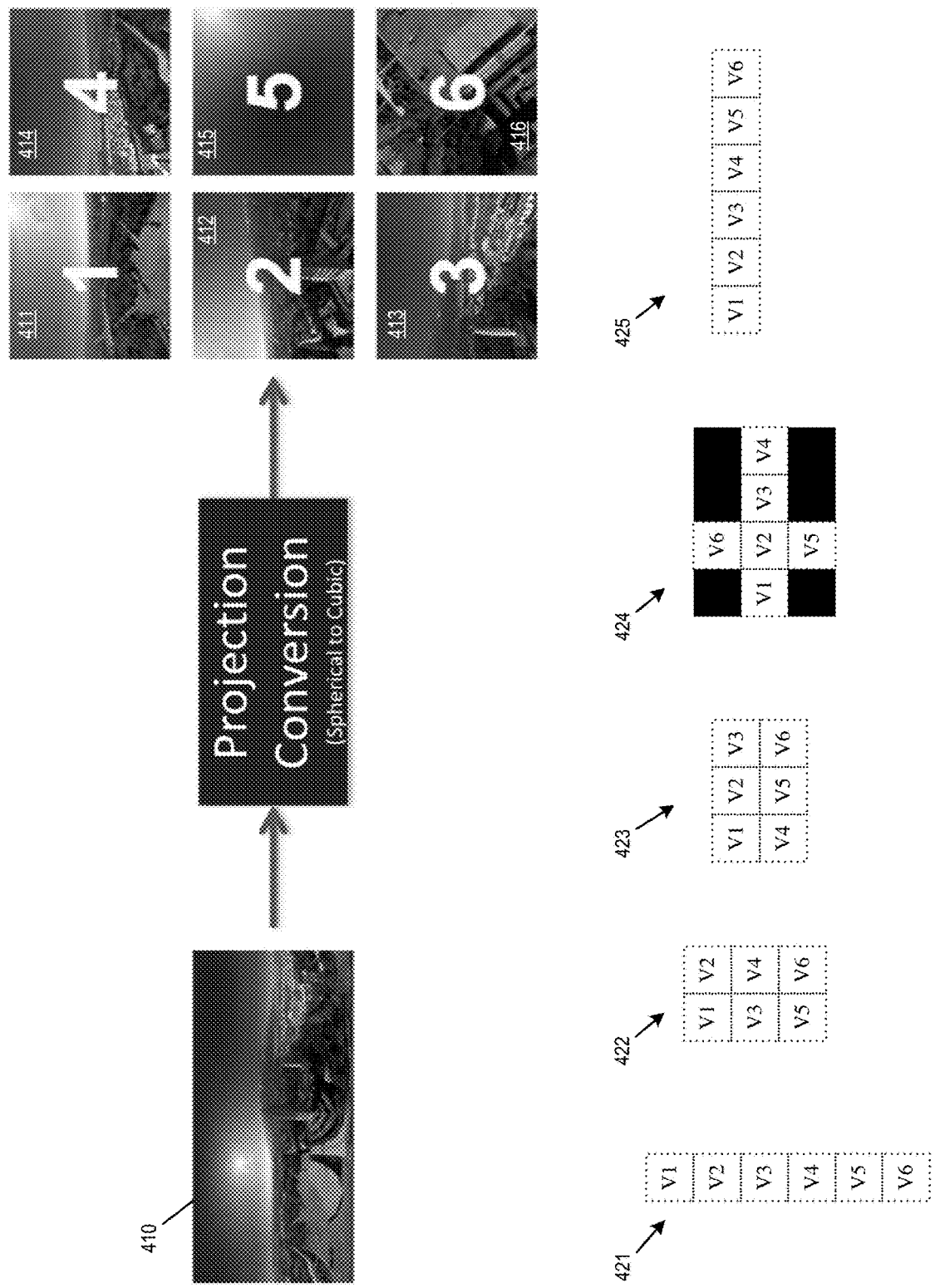
FIG. 4 illustrates an omnidirectional image that is divided into multiple views that corresponds to faces of a cube.

FIG. 4 illustrates an omnidirectional image that is divided into multiple views that corresponds to faces of a cube. As illustrated, an equirectangular projection image 410 is converted into six cubic faces 411-416. These six faces are then arranged together as different views of an omnidirectional image for a 360VR omnidirectional video. The figure illustrates several omnidirectional images based on different arrangements of the six cubic faces, including 6×1 single column formation (421), 3×2 two column formation (422), 2×3 three column formation (423), 3×4 unfolded-box formation (424), and 1×6 single row formation (425). The images in the six faces may form one continuous image (as is the case of an unfolded box). The images in the six faces may also be disjointed.

In some embodiments, each view or face is coded as an independent region. In some embodiments, the different independent regions are coded as different data segments defined by the coding standard, such as slices, tiles, or other types of segmentation. The view-specific data of a view is coded as one or more slices (or one or more tiles) such that the data in a view-specific slice of a given view is logically independent of view-specific slices of other views. (Although a view-specific slice of a given view may logically depend on another view-specific slice of the same given view.) In other words, the video decoder can decode the image content of a given view by decoding the view-specific slices of the given view without decoding the view-specific slices of other views.

Figure 5:
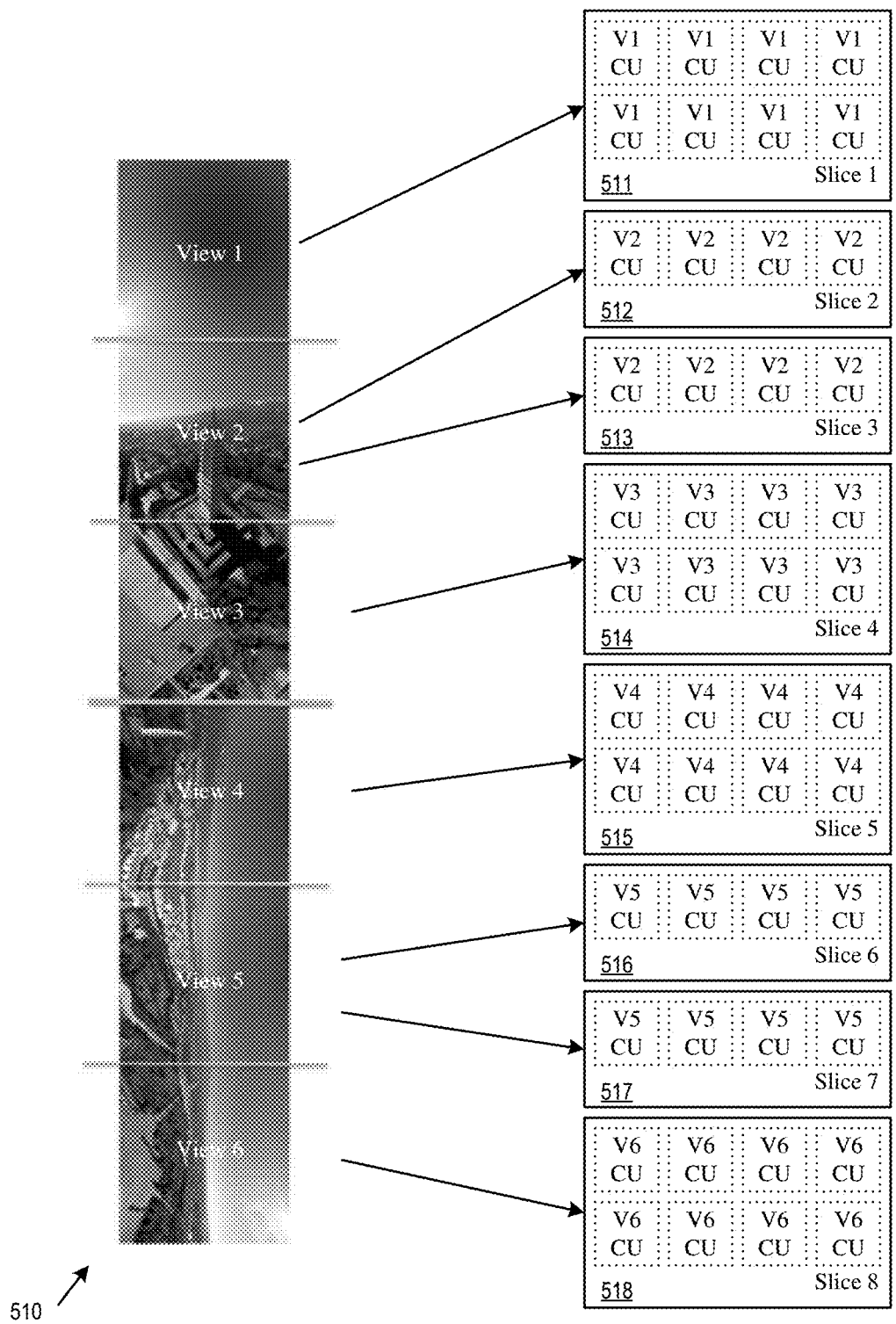
FIG. 5 illustrates an omnidirectional image in which each view is encoded as one or more slices.

FIG. 5 illustrates an omnidirectional image in which each view is encoded as one or more slices. As illustrated, an omnidirectional image 510 (a video picture in the omnidirectional video 110) is encoded as slices 511-518. Each of the slices 511-518 is a view-specific slice that contains data specific to one view of the image 0510. As illustrated, the slice 511 contains data specific to view 1, the slice 512 and 513 contain data specific to view 2, the slice 514 contains data specific to view 3, the slice 515 contains data specific to view 4, the slices 516 and 517 contains data specific to view 5, and the slice 518 contains data specific to view 6.

As illustrated, each slice includes one or more pixel blocks (e.g., macroblocks, coding units (CUs)). A pixel block may be intra-coded (not referencing pixels outside of the block), intra-predicted (referencing pixels of the same image or video picture), or inter-predicted (referencing pixels of a temporally different image or video picture by e.g., motion vectors).

The view-specific slices of the different views are logically independent of each other. Thus, for example, the decoder 1800 may decode the pixel blocks/CUs of the slice 514 (specific to view 3) without decoding any of the slices 511-513 and 515-518.

In some embodiments, to ensure that the view-specific data segments (slices, tiles) of given view can be decoded independently, each view-specific data segment is independently entropy encoded and does not depend on the entropy encoding state of other segments. Specifically, the entropy coding dependencies are not allowed to cross boundaries of a view (or face). The statistics used in context-adaptive entropy coding is initialized for every face or view.

Figure 6:
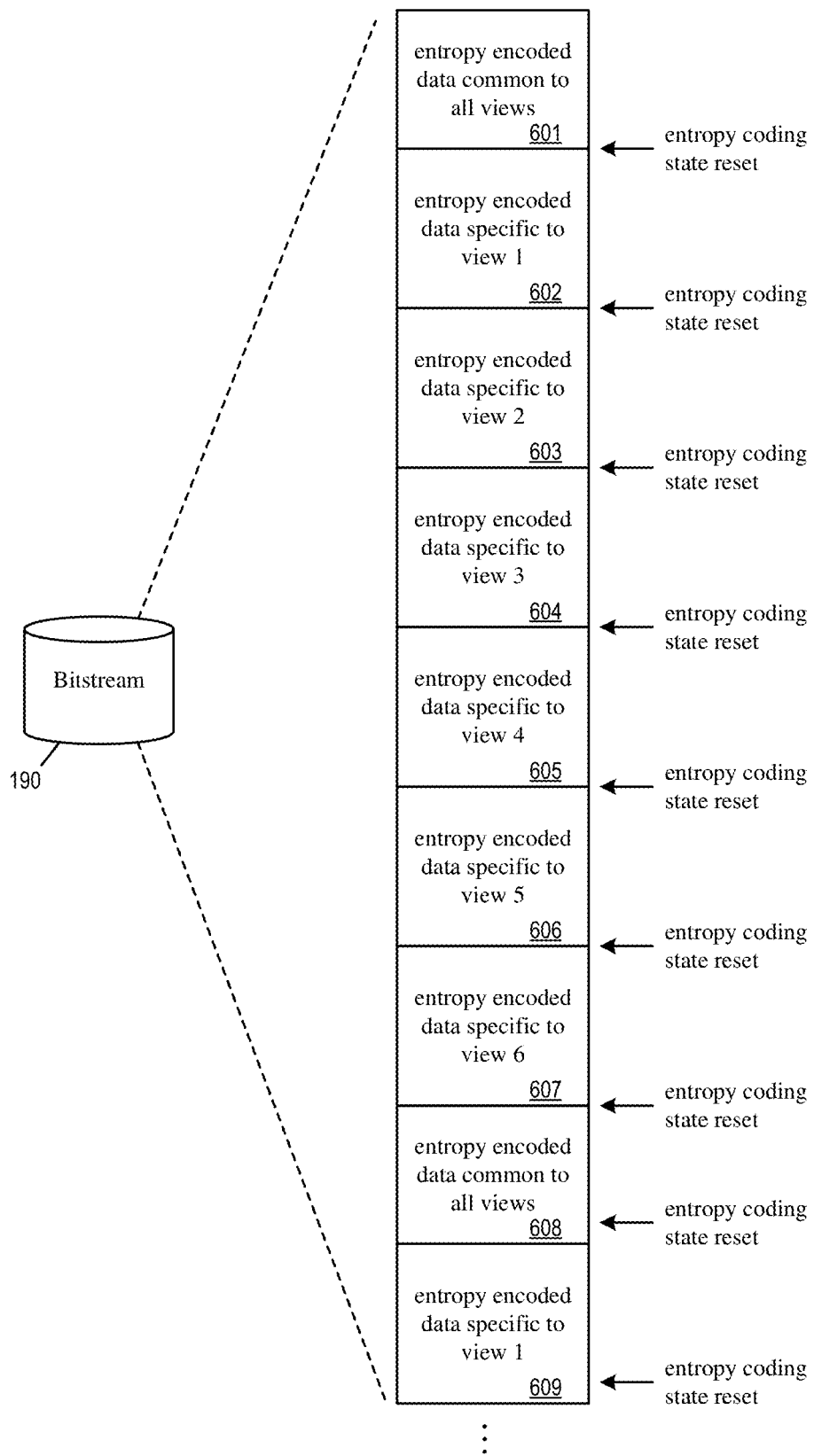
FIG. 6 conceptually illustrates the entropy encoding of an omnidirectional video in order to facilitate independent decoding of different views.

FIG. 6 conceptually illustrates the entropy encoding of an omnidirectional video in order to facilitate independent decoding of different views. The figure illustrates the entropy coding of the bitstream 190, which includes various data segments 601-609. The segments 602-607 and 609 are segments that correspond to image content of different views of the omnidirectional video 110 (e.g., slices such as slices 511-518). The segments 601 and 608 are segments that carry data common to all views (e.g., picture header, sequence header, etc.).

As illustrated, the entropy encoding state (e.g., statistics used in context-adaptive entropy coding) of the bitstream 190 resets at the start of each data segment such that each data segment can be independently extracted and entropy decoded. This allows the video decoder 1800 to extract the image content of a given view by entropy decoding the data segments of that view without having to entropy decode data segments of other views.

In some embodiments, to ensure that the view-specific data segments (slices, tiles) of a given view can be decoded independently, the pixel blocks of each data segment are encoded without referencing pixels of any other views. Specifically, when intra-prediction coding a pixel blocks of a given view, the intra-prediction is constrained to reference pixels of the same view in the same video picture; when inter-prediction coding a pixel block of a given view, the inter-prediction is constrained to reference pixels of the same view in a temporally different video picture.

FIG. 7 illustrates intra-prediction coded pixel blocks that are constrained to reference pixels within the same view of the video picture. The figure illustrates a video picture 700 of an omnidirectional video. (The figure depicts only four views for simplicity). Each view of the video picture 700 includes one or more CUs that are intra-prediction coded to reference pixels of the same video picture. Among these, the CUs 711, 721, 731, 741, and 742 are sufficiently distanced from the top and left boundaries of their respective views, while the CUs 719, 728, 729, 739, and 749 are positioned close to the top or left boundary of their respective views.

In order to support independent decoding of different views, in some embodiments, the encoder 1700 is constrained to use only intra-prediction modes that do not reference pixels outside of the CU's view. For the illustrated example, the CUs 711, 721, 731, 741, and 742 can be coded by any intra-prediction mode that reference pixels to the left or top of those CUs, since pixels to the left or top of those CUs are within the same view. On the other hand, CUs 719, 728, 729, 739, and 749 cannot be intra-prediction coded by at least some of the intra-prediction modes, since some of the intra-prediction modes for these CUs reference pixels outside the boundary of their respective views. Therefore, to encode the CU 729 of view 2 by intra-prediction, the encoder 1700 is constrained to use only intra-prediction modes that reference pixels to the left of CU 729 but not the intra-prediction modes that reference pixels to the top of CU 729, since pixels to the top of CU 729 may belong to another view (view 1).

In some embodiments, when the CUs reference pixels for the intra prediction outside the boundary of their respective views, the referenced pixels are considered as unavailable and may be replaced by a default value based on the value of a neighboring reference pixel located inside their respective views.

FIG. 8 illustrates inter-prediction coded pixel blocks that are constrained to reference pixels of the same view (in temporally different video pictures.) The figure illustrates a video sequence 800 having several video pictures 801-804 that are scheduled for display at different times. The video sequence 800 is part of an omnidirectional video, whose video pictures includes multiple views (The figure depicts only four views for simplicity).

The figure depicts several CUs that are inter-prediction coded, including CUs 811, 821, 822, 831, 832, 841. The inter-prediction coded CUs are part of the video picture 802. Each of the inter-prediction coded CUs includes one or more referential elements (e.g., motion vectors) that reference pixels in other video pictures (e.g., 801, 803 and 804, which are video pictures having different display time than the video picture 802).

To empower the decoder to independently decode the image content of the different views, the inter-prediction coded CUs are constrained to reference only pixels in the same view and not pixels in other views. For example, the CU 811 is in view 1 of video picture 802. It has motion vectors that reference pixels in view 1 of video pictures 801 and 804. The CU 821 is in view 2 of video picture 802. It has motion vectors that reference pixels in view 2 of video picture 801 and 803. None of the CUs 811, 821, 822, 831, 832, and 841 have motion vectors that reference pixels outside of their respective views.

In some embodiments, in order to ensure that the motion vectors of a pixel block stay within the same view, the encoder 1700 encodes only motion vectors (whether by merge mode, motion vector prediction, or other methods) that stay within the same view as the pixel block. In some embodiments, the encoder 1700 and the decoder 1800 perform motion vector clipping operations. The motion vector clipping operation modifies motion vectors that reference pixels outside of the view into clipped motion vectors that reference only pixels within the same view as the pixel block and not any pixels outside of the view.

Figure 9B:
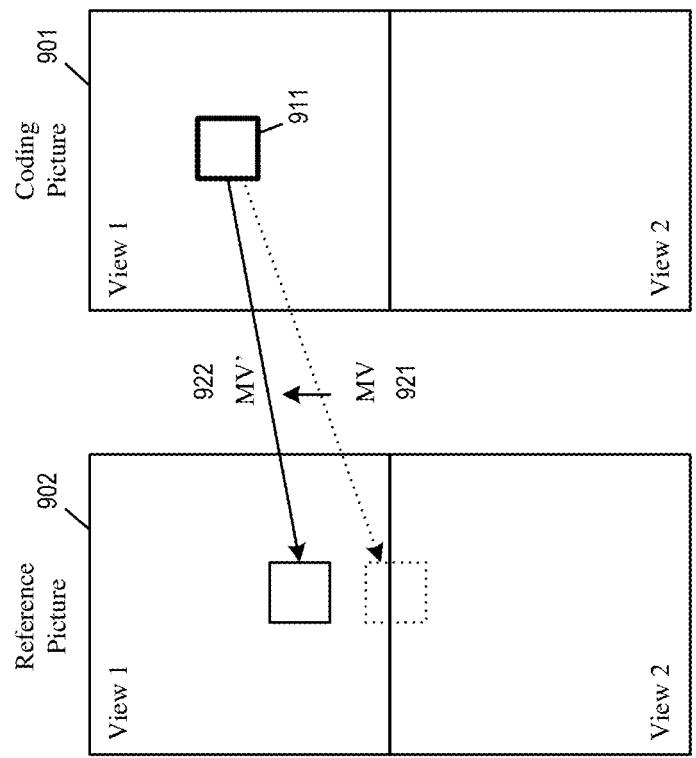
FIGS. 9a-b illustrate motion vector clipping operations that ensure inter-predicted pixel blocks reference only pixels of the same view.
Figure 9A:
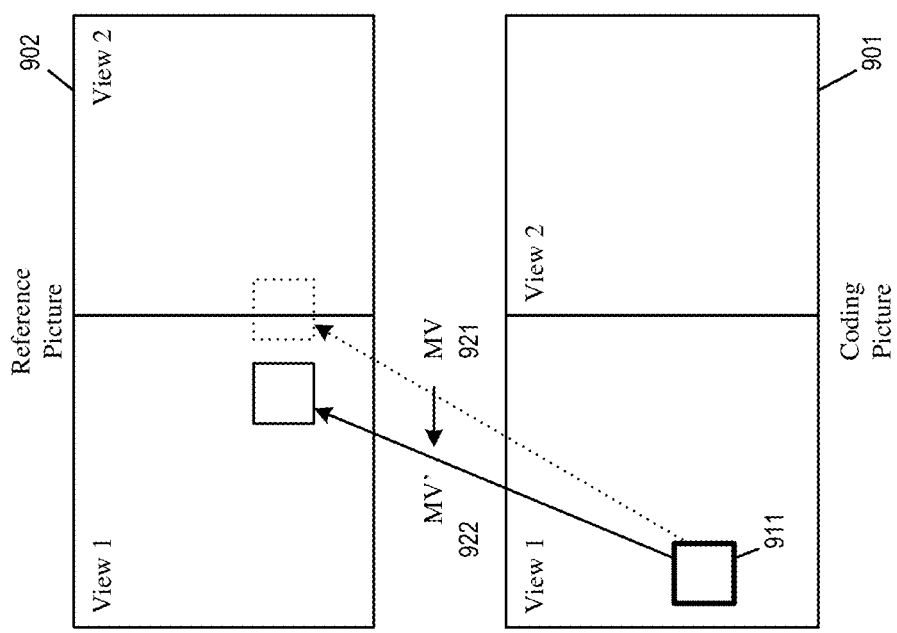

FIGS. 9*a-b* illustrate motion vector clipping or modifying operations that ensure inter-predicted pixel blocks reference only pixels of the same view and not pixels beyond the view. FIGS. 9*a-b* illustrate a CU 911 in view 1 of a coding picture 901 (a video picture that is being encoded or decoded). The CU 911 is originally assigned a motion vector 921 that references pixels in view 2 of a reference picture 902. The motion vector clipping or modifying operation modifies the motion vector 921 into a clipped or a modified motion vector 922, which references pixels entirely within view 1 of the reference picture 902.

In some embodiments, the motion vector clipping operation moves the target of the motion vector to a location within the same view that is closest to the original target of the motion vector. In the example of FIG. 9*a*, view 2 is to the right of view 1, so the motion vector clipping operation moves the target of the motion vector in a purely x-direction to within view 1 of the reference picture 902. In the example of FIG. 9*b*, view 2 is to the bottom of view 1, so the motion vector clipping operation moves the target of the motion vector in a purely y-direction back to within view 1 of the reference picture 902.

In some embodiments, in order to ensure that the motion vectors of a pixel block stay within the same view, a motion vector predictor candidate for a motion vector that references pixels outside of its respective view is considered as unavailable. In some embodiments, a motion vector targeting reference pixels outside its respective view may be replaced by another motion vector derived from the reference picture list or from a spatial neighboring reference block or a temporal reference block.

In some embodiments, the encoder 1700 performs the motion vector clipping operation by modifying a boundary-exceeding motion vector before the motion vector is encoded. In some embodiments, the encoder 1700 encodes the motion vector into the bitstream without modification, while letting both the encoder 1700 and the decoder 1800 detect motion vectors that exceed view boundary. Upon detection of a boundary-exceeding motion vector, the encoder 1700 and the decoder 1800 would each move the target of the motion vector to a same location inside the same view when performing motion compensation.

Some video coding standards provide multiple different ways of encoding a motion vector. For example, H.265 HEVC allows the encoder to encode the motion vector by merge mode or motion vector prediction (MVP). Merge mode allows for motion vectors to be inherited from neighboring prediction blocks, while motion vector prediction uses differentially coded motion vector predictors based on motion vectors of neighboring CUs (specifically neighboring CUs that are inter-prediction coded). Both merge mode and motion vector prediction allows the encoder 1700 to choose from a list of candidates when encoding a motion vector.

Figure 10A:
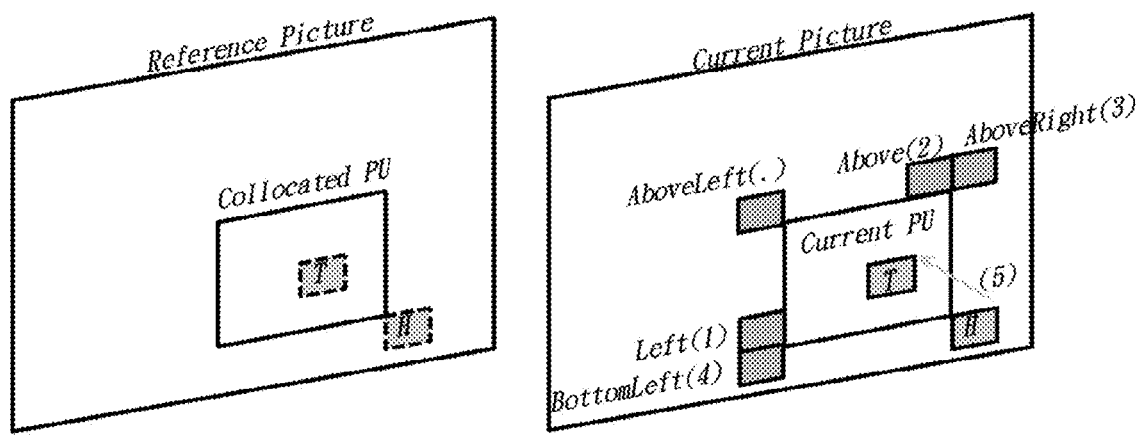
FIG. 10a illustrates merge mode candidates of HEVC.

FIG. 10*a* illustrates merge mode candidates of HEVC, including spatial and temporal candidates derived from the spatially and temporally neighboring blocks of the block being encoded. Each of the candidate neighboring blocks may be an inter-prediction coded block having a motion vector that the pixel block may inherit.

Figure 10B:
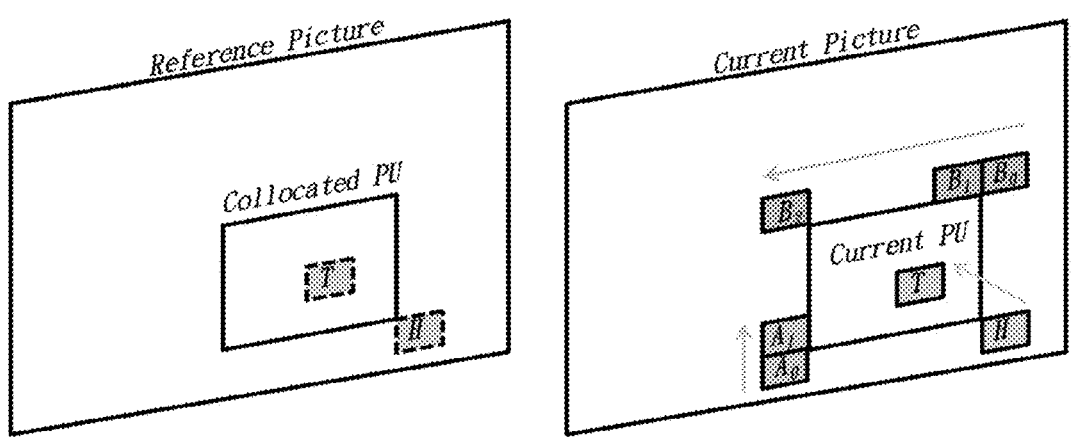
FIG. 10b illustrates motion vector prediction candidates of HEVC.

FIG. 10*b* illustrates motion vector prediction candidates of HEVC, including the spatial and/or temporal candidates derived from spatially and temporally neighboring block of the block being encoded. Each of the candidate neighboring blocks may be an inter-prediction coded block having a motion vector that the encoder may use as a motion vector predictor.

As mentioned, in some embodiments, the video encoder does not encode motion vectors that reference pixels in other views, regardless of whether the motion vectors are coded by merge mode or MVP. To ensure the encoded motion vector stay within the view of its associated pixel block, the encoder in some embodiments exclude merge candidate or MVP candidates that may result in a boundary-exceeding motion vector. In some embodiments, the encoder derives or selects another motion vector to replace the merge candidate or MPV candidate that may result in a boundary-exceeding motion vector.

In some embodiments, the encoder also excludes merge candidates or MVP candidates belonging to neighboring pixel blocks of another view. The encoder may accomplish this by identifying such merge candidates or MVP candidates and by avoiding selecting the identified candidates for encoding the motion vector (e.g., by considering such candidates as non-available). The encoder may also clip the motion vector computed from the selected candidate (whether from merge mode or MVP) to within the current view (e.g., to the boundary of the view) as described by reference to FIGS. 9*a-b* above. The selection of the candidate is conveyed to the decoder as part of a set of motion vector information through the bitstream 190 so that the decoder may perform the same motion vector clipping.

Figure 11:
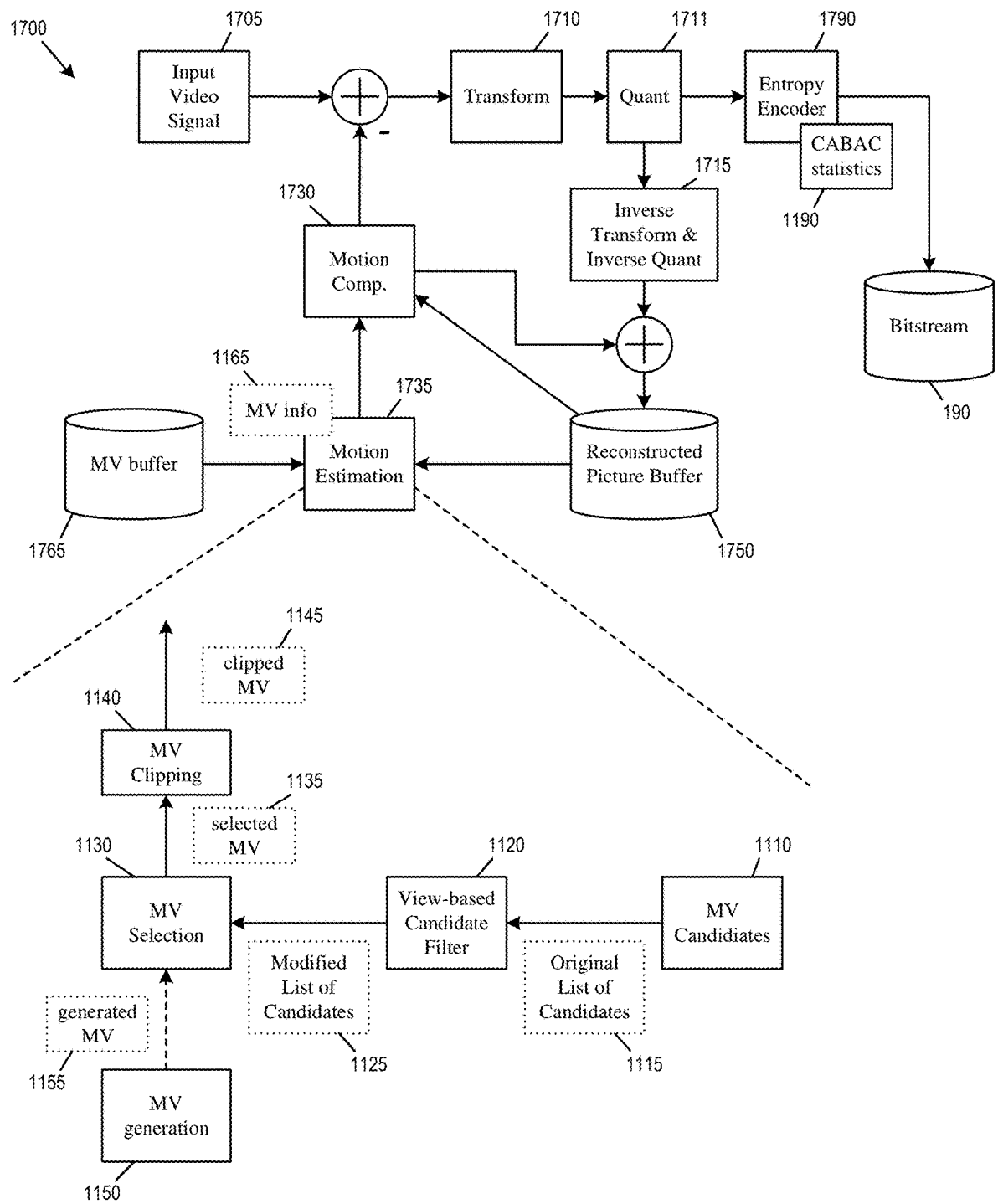
FIG. 11 illustrates a video encoder that is configured to encode an omnidirectional video into a bitstream such that the different views of the omnidirectional video can be decoded independently.

FIG. 11 illustrates a video encoder 1700 that is configured to encode an omnidirectional video into a bitstream such that the different views of the omnidirectional video can be decoded independently. Specifically, the figure illustrates the components of the video encoder 1700 operating to ensure that the encoded image content of any given view can be extracted and decoded independently of other views. The video encoder 1700 and its various components are described in greater detail by reference to FIG. 17 below.

As illustrated in FIG. 11, the entropy encoder 1790 maintains the state and/or statistics 1190 for context-adaptive entropy coding. The entropy encoder 1790 resets the state of the entropy coding whenever it receives data for a different view (from the quantizer 1711) and starts a new segment to store the data into the bitstream 190.

The motion estimation module 1735 performs motion estimation by selecting a candidate from merge mode and/or MVP based on the content of the motion vector buffer 1765 and the reconstructed picture buffer 1750. As illustrated, the motion estimation module 1735 includes a motion vector candidate module 1110, a view-based candidate filter 1120, a motion vector selection module 1130, a motion vector clipping module 1140, and a motion vector generation module 1150. These modules may be modules of software instructions being executed by one or more processing units (e.g., a processor) of a computing device or electronic apparatus. These modules may also be modules of hardware circuits implemented by one or more integrated circuits (ICs) of an electronic apparatus.

The motion vector candidate module 1110 identifies and provides a list of candidates (original list of candidates 1115) for merge mode and/or MVP based on motion vectors of temporally and spatially neighboring pixel blocks that are stored in the motion vector buffer 1765. The view-based candidate filter 1120 goes through the list of candidates to identify merge mode candidate(s) and/or MVP candidate(s) that may reference pixels beyond the current view. The identified candidates are then removed from the list of candidates to create a modified list of candidates 1125. The motion vector selection module 1130 selects a candidate from the modified list of candidates 1125. The motion vector selection module 1130 may also receive a generated motion vector 1155 from the motion vector generation module 1150, which may generate the generated motion vector 1155 based on a search. This allows the motion vector selection module 1130 to select a motion vector 1135 from among the candidates based on the neighboring blocks (merge mode and MVP) or the generated motion vector 1155.

The motion estimation module 1735 then sends a set of motion vector information 1165 for the selected motion vector to the entropy encoder 1790 to encode into the bitstream 190. The motion vector information 1165 may include a motion vector mode (e.g., whether the motion vector is encoded by merge mode or MVP), a candidate selection index, and a motion vector difference (or MVD, the difference between the selected candidate motion vector and the actual final motion vector to be used). The motion vector information 1165 is encoded into the bitstream 190 as part of the data for the current view.

The motion vector clipping module 1140 receives the selected motion vector 1135 and clips the motion vector to the boundary of the current view. In some embodiments, the selected motion vector is encoded into the bitstream before it is clipped by the motion vector clipping module 1140. In some embodiments, the selected motion vector is encoded into the bitstream after it is clipped by the motion vector clipping module 1140. The clipped motion vector 1145 is used by the motion compensation module 1730 to reconstruct the pixel block being encoded. The motion vector clipping module 1140 may be part of the motion compensation module 1730 or the motion estimation module 1735.

Figure 12:
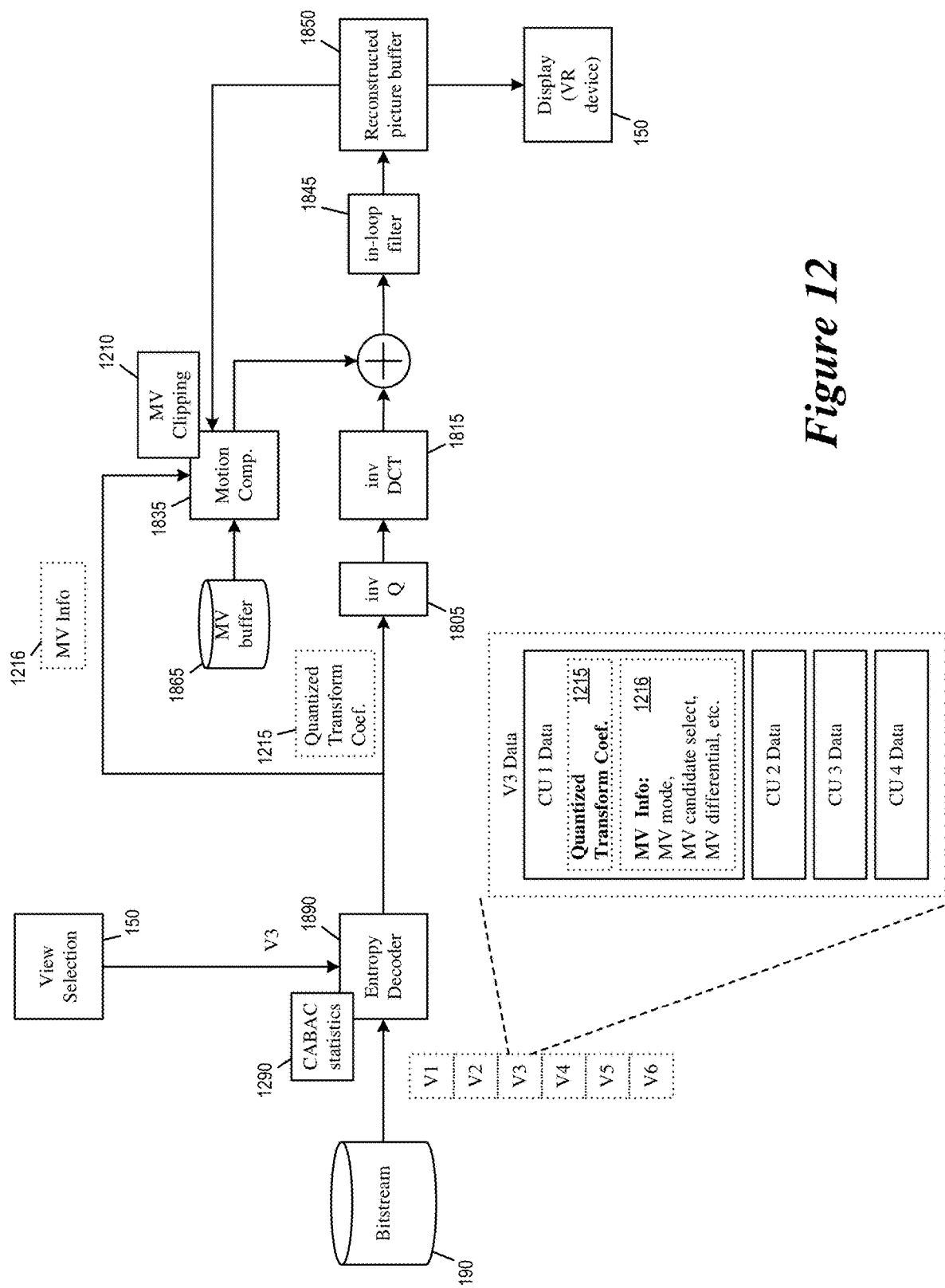
FIG. 12 illustrates a video decoder that is capable of independently decoding a selected view of an omnidirectional video.

FIG. 12 illustrates a video decoder that is capable of independently decoding a selected view of an omnidirectional video. Specifically, the figure illustrates the components of the video decoder 1800 operating to extract and decode the selected view of the omnidirectional video 110 without decoding other views. The video decoder 1800 and its various components are described in greater detail by reference to FIG. 18 below.

As illustrated in FIG. 12, the entropy decoder 1890 maintains the state and/or statistics 1290 for context-adaptive entropy coding. The entropy encoder 1890 resets the state of the entropy coding whenever it detects data for a different view from the bitstream 190. The entropy decoder 1890 also receives a view selection signal from the VR device 150 so that the entropy decoder 1890 know which view-specific data to extract from the bitstream 190.

The view-specific data of the selected view extracted by the entropy decoder includes data for various pixel blocks. The figure illustrates an example CU 1215 that includes quantized transform coefficients as well as motion vector information 1216 for computing a motion vector for the CU 1215.

The motion vector information 1216 is forwarded to the motion compensation module 1835, which may include a motion vector clipping module 1210. The motion compensation module 1835 reconstructs a motion vector based on the motion vector information 1216 and reference motion vectors stored in the motion vector buffer 1865. The motion vector clipping module 1210 then, if necessary, clips the reconstructed motion vector to within the view selected by the view selection module 150. The motion compensation module 1835 then uses the motion vector and/or the clipped motion vector to fetch pixel data from the reconstructed picture buffer 1850. The data fetched from the reconstructed picture buffer 1850 is summed with data provided by inverse transform module 1815 and filtered by in-loop filters 1845 before being stored in the reconstructed picture buffer 1850.

For some embodiments, in-loop filter operations such as deblocking, SAO, or ALF do not cross the boundary between faces or views. In some embodiments, the filter is disabled on the boundary. In some embodiments, if the pixel value used in the filtering operation is located in another face or view, it could be considered as non-available, or replaced by a default value (e.g., its neighboring pixel value or a boundary pixel value).

In order to allow the video decoder 1800 to switch to another face/view while performing independent decoding of a selected view, the video systems in some embodiments uses a hierarchical prediction structure. Specifically, the video decoder is allowed to switch to another view or face of the omnidirectional video during decode of a base layer picture.

Figure 13:
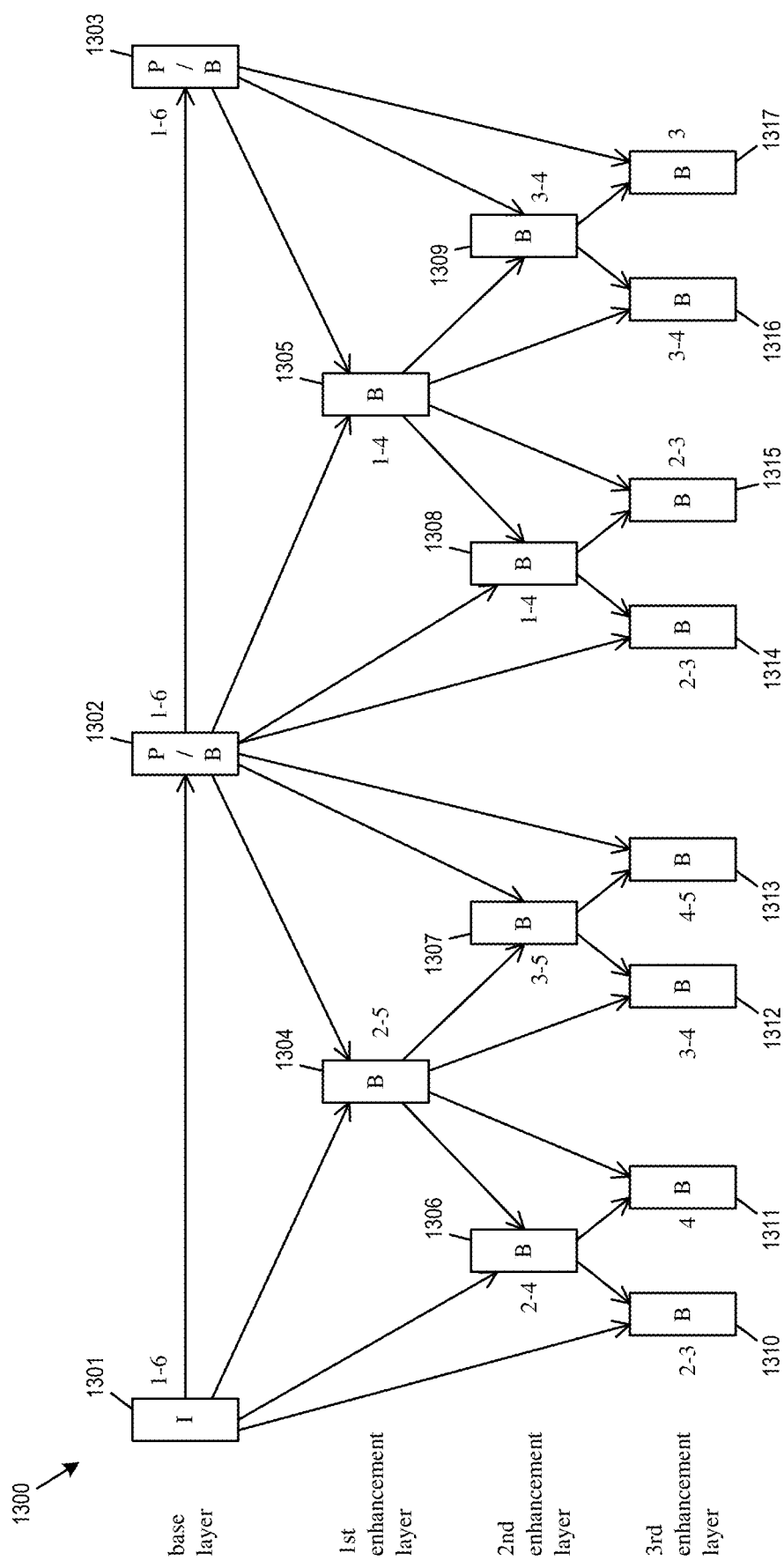
FIG. 13 conceptually illustrates a video sequence that is encoded according to a hierarchical prediction structure.

FIG. 13 conceptually illustrates a video sequence 1300 that is encoded according to a hierarchical prediction structure. The video sequence 1300 includes base layer pictures 1301-1303 as well as non-base layer or enhancement layer pictures 1304-1317. The base layer pictures 1301-1303 may reference each other but not any of the non-base layer pictures. The first enhancement layer pictures 1304-1305 may reference the base layer pictures but not any second or third layer enhancement layer pictures. The second enhancement layer pictures 1306-1309 may reference the base layer pictures 1301-1303 and the first enhancement layer pictures 1304-1305 but not any third layer enhancement layer pictures. The third layer enhancement layer pictures 1310-1317 may reference any lower layer pictures 1301-1309.

In order to allow the video decoder 1800 to smoothly switch to another face/view while performing independent decoding of a selected view, when decoding the base layer pictures 1301-1303, the video decoder decodes image content for the selected view as well as some or all of the non-selected views. When decoding a non-base layer (enhancement layer) picture, the selected target view/face is decoded and displayed, but the decoder may switch to another selected view or face that was decoded at the lower layer pictures (including the base layer) that the non-base layer picture references. For example, the first enhancement layer picture 1304 references base layer pictures 1301 and 1302, both of which decoded all of the available views (1 through 6). Consequently, the decoder when decoding the picture 1304 may also decode and display any of the views 1 through 6, though it chooses to decode only views 2-5 and not other views. As another example, the third layer enhancement layer picture 1313 references second enhancement layer picture 1307 and base layer picture 1302. Since the decoder decoded views 3 through 5 for the picture 1307, the decoder may decode and display any of the views 3 through 5 when decoding the picture 1313, though it chose to decode only views 4 through 5 and not other views.

In some embodiment, when encoding a current slice/view/face/tile, at least some of the information of a neighboring view is embedded in the view-specific data of the current view in the bitstream. For example, in some embodiments, the motion vector information of pixel blocks or CUs in a neighboring view/face/tile/slice is encoded and embedded into the view-specific data of current slice/view/face/tile in the bitstream in order to provide better MVP prediction. In some embodiments, the boundary pixels of a neighboring slice/view/face/tile are encoded and embedded into the view-specific data of the current slice/view/face/tile in the bitstream in order to provide the boundary reference pixel for Intra prediction when coding the current slice/view/face/tile (rather than avoiding intra-prediction modes that reference pixels in a neighboring view as described by reference to FIG. 7 above.)

Figure 14:
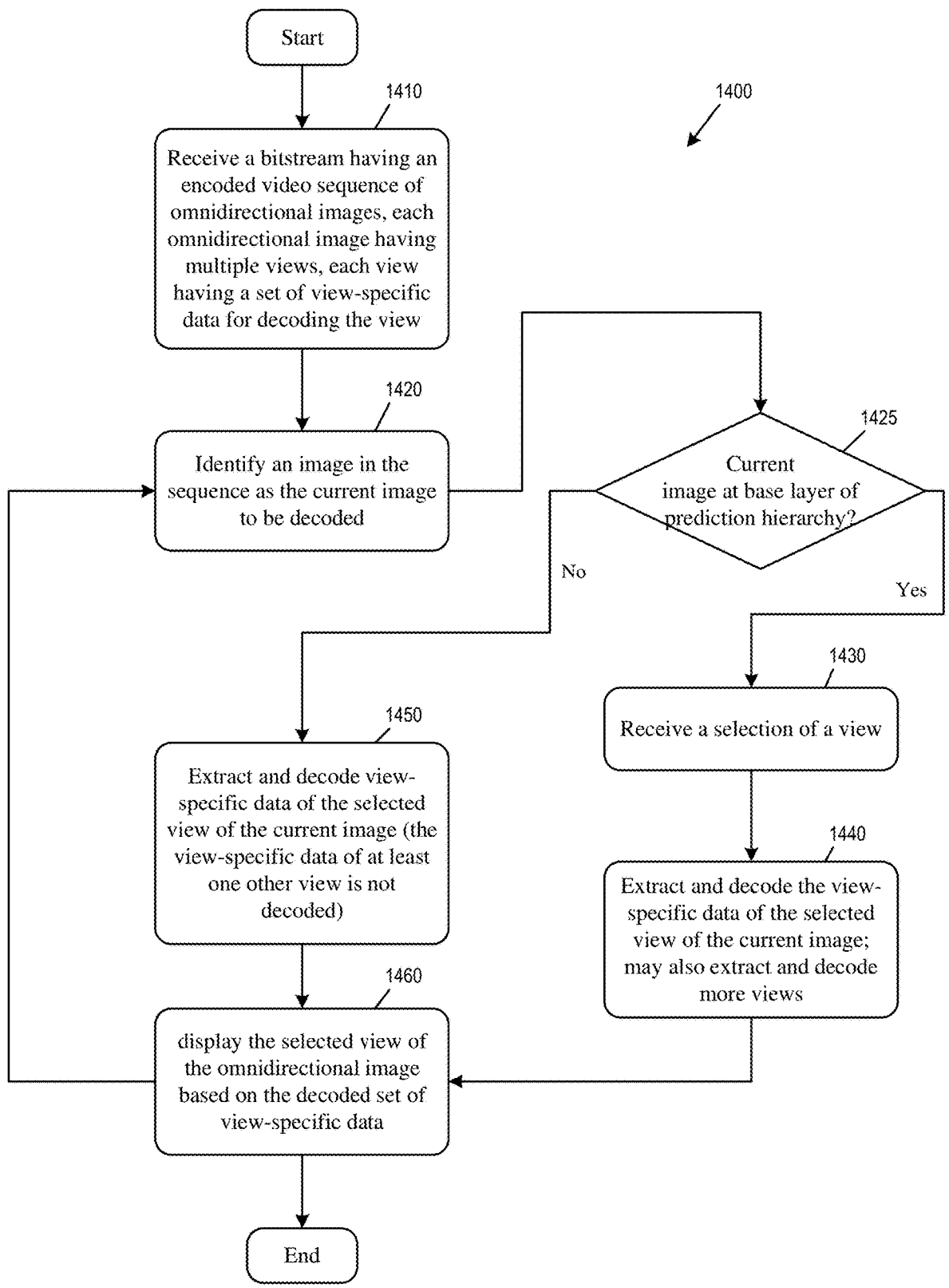
FIG. 14 conceptually illustrates a process for performing independent decoding of a selected view.

FIG. 14 conceptually illustrates a process 1400 for performing independent decoding of a selected view. The process receives a selection of one or more views, extracts and decodes the selected view(s) without decoding views that are not selected.

In some embodiments, one or more processing units (e.g., a processor) of a computing device implementing the decoder 1800 performs the process 1400 by executing instructions stored in a computer readable medium. In some embodiments, an electronic apparatus implementing the decoder 1800 performs the process 1400.

The decoder receives (at step 1410) a bitstream having an encoded sequence of omnidirectional images, each omnidirectional image having multiple views, each view having a set of view-specific data for decoding view. The view specific-data of the different views are encoded in different segments of the bitstream such as slices or tiles.

The decoder identifies (at step 1420) an omnidirectional image in the sequence of omnidirectional images as the current image to be decoded. The decoder then determines (at step 1425) whether the current image to be decoded is at a base layer of a prediction hierarchy. If so, the process proceeds to step 1430. If the current image is not at a base layer of a prediction hierarchy, the process proceeds to step 1450.

At step 1430, the decoder receives a new selection of one or more views. In some embodiments, the decoder receives selection of one view and identifies one or more views related to the selected view (e.g., neighboring views) to be decoded and displayed along with the selected view.

The decoder also extracts (at step 1440) and decodes the view-specific data of the selected view of the current image. The decoder may also decode more views (e.g., all views) of the image to allow view switching during decoding of enhancement layer pictures. The process then proceeds to 1460.

At step 1450, the decoder extracts and decodes view-specific data of the selected view(s) of the current image. The view-specific data of at least one of the non-selected views is not extracted nor decoded.

The decoder displays (at step 1460) the selected view(s) of the current image. For some embodiments in which the display device is not part of the decoder, the decoder, through an input interface, sends the reconstructed or decoded pixels of the selected view(s) to the display device, which may be a VR device. The process 1400 then ends or returns to the step 1420 to identify and decode another image in the video sequence.

Figure 15:
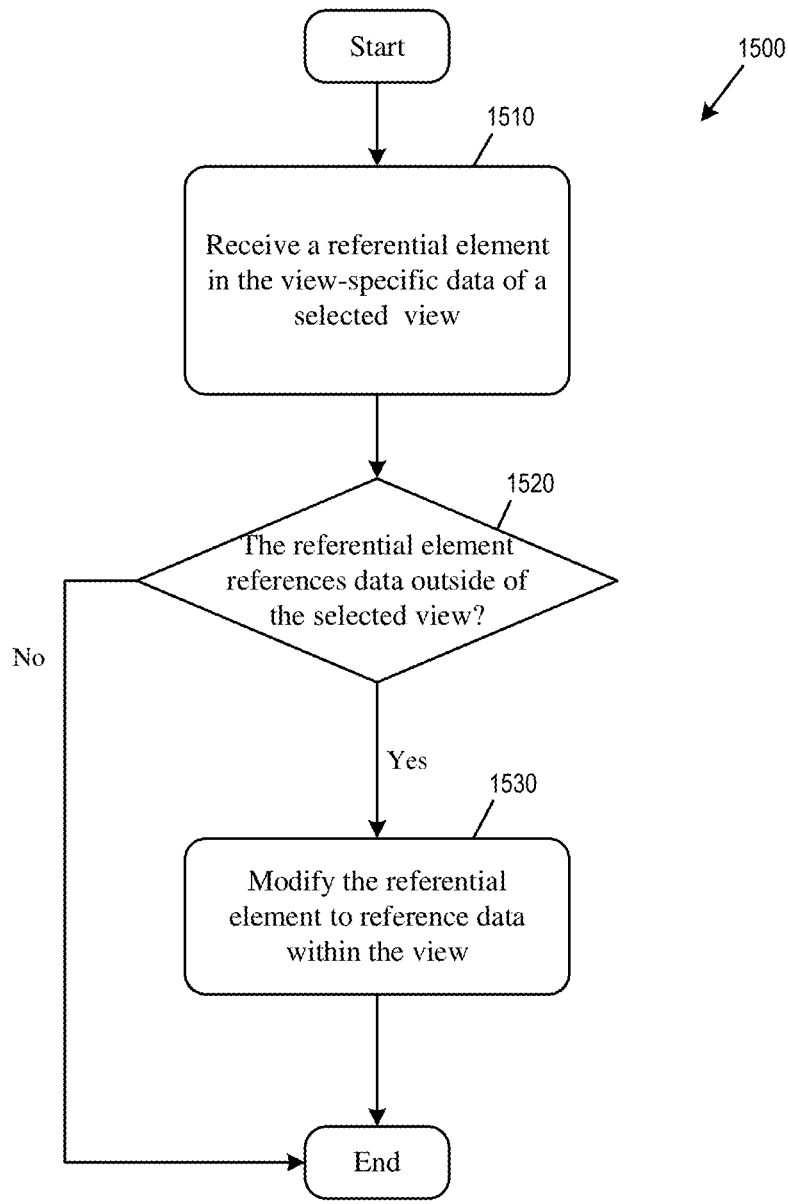
FIG. 15 conceptually illustrates a process for ensuring that referential elements of a particular view not exceed the boundary of the particular view.

FIG. 15 conceptually illustrates a process 1500 for ensuring that referential elements of a particular view not exceed the boundary of the particular view. The decoder 1800 performs the process 1500 when it is decoding a pixel block belonging to the selected view of the current image (e.g., when the decoder is performing step 1450 of the process 1400).

The decoder receives (at 1510) a referential element in the view specific data of the selected view from the bitstream. The referential element may be encoded as a set of motion vector information that may include a motion vector, a motion vector mode (e.g., whether the motion vector is encoded by merge mode or MVP), a candidate selection, and/or a motion vector difference (or MVD, the difference between the selected candidate motion vector and the actual final motion vector to be used).

The decoder then determines (at 1520) whether the referential element references data (e.g., pixels) outside of the selected view. If so, the decoder modifies (at step 1530) the referential element to reference data within the selected view. For example, the decoder may perform motion vector clipping to clip the motion vector to reference pixels within the boundary of the selected view.

Figure 16:
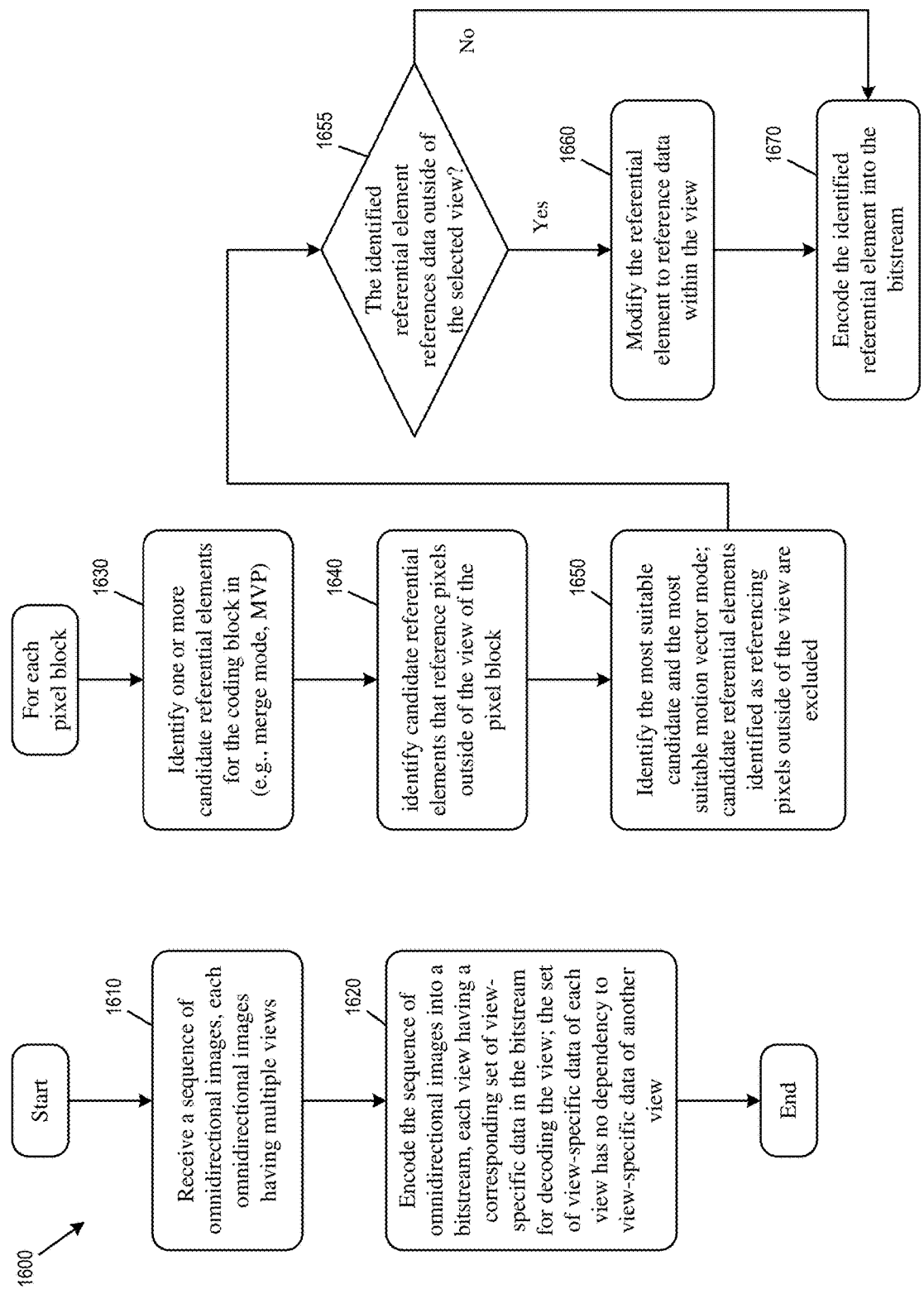
FIG. 16 conceptually illustrates a process that the encoder performs when it encodes an omnidirectional video into a bitstream that allows independent decoding of a selected view.

FIG. 16 conceptually illustrates a process 1600 that the encoder 1700 performs when it encodes an omnidirectional video into a bitstream that allows independent decoding of a selected view. In some embodiments, one or more processing units (e.g., a processor) of a computing device implementing the encoder 1700 performs the process 1600 by executing instructions stored in a computer readable medium. In some embodiments, an electronic apparatus implementing the encoder 1700 performs the process 1600.

The process 1600 starts when the encoder receives (at step 1610) a video sequence of omnidirectional images, each omnidirectional image having multiple views. The encoder then encodes (at step 1620) the sequence of omnidirectional images into a bitstream, each view having a corresponding set of view-specific data in the bitstream for decoding the image content of the view. The set of view-specific data of each view has no dependency to view-specific data of any other view. This allows each set of view-specific data to be decoded independently from view-specific data of other views.

For each pixel block or coding unit, the encoder identifies (at step 1630) one or more candidate referential elements for encoding the pixel block. These candidate referential elements may include motion vectors of neighboring pixel blocks and/or a newly generated motion vector based on search. These referential elements may serve as a merge mode motion vector or a MVP motion vector predictor.

The encoder identifies (at step 1640) candidate referential elements that may result in a motion vector that references pixels outside of the view of the pixel block. The encoder then identifies (at step 1650) the most suitable candidate referential element and the most suitable motion vector mode; the candidate referential elements identified as referencing pixels outside of the view are excluded from consideration.

The encoder then determines (at step 1655) whether the identified most suitable referential element references data outside of the selected view. If the most suitable referential element does not reference data outside of the view, the process proceeds to step 1670 for the encoder to encode the most suitable referential element. If the most suitable referential element does reference data outside of the view, the encoder modifies (at step 1660) the referential element to reference only data entirely within the view (e.g., for motion compensation).

At the step 1670, the encoder encodes the identified most suitable referential element into the bitstream as a set of motion vector information. The set of motion vector information may include a motion vector, a motion vector mode (e.g., whether the motion vector is encoded by merge mode or MVP), a candidate selection, and/or a motion vector difference (or MVD, the difference between the selected candidate motion vector and the actual final motion vector to be used).

Video Encoder

Figure 17:
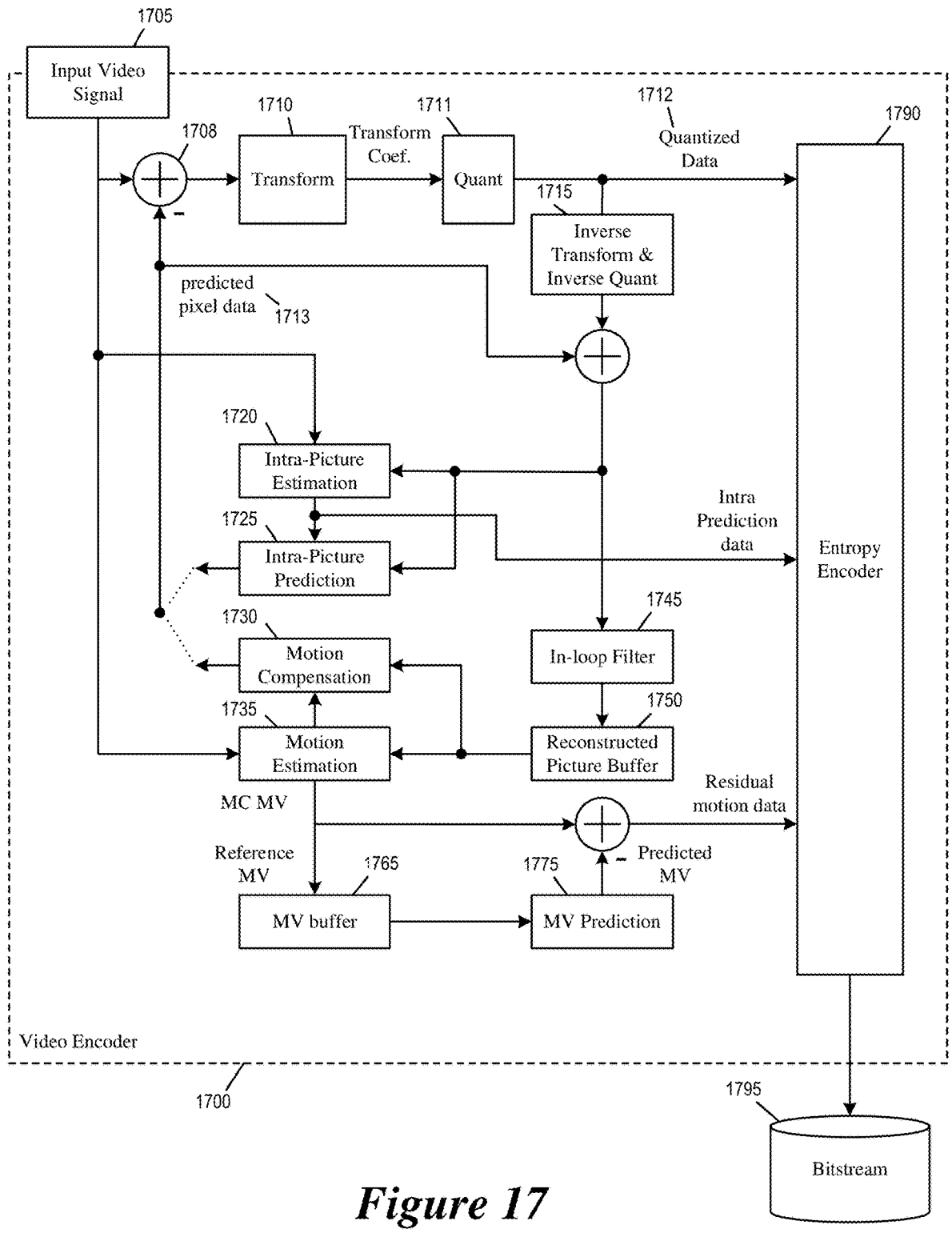
FIG. 17 illustrates the video encoder that encodes an omnidirectional video as a bitstream that allows independent decoding of different views.

FIG. 17 illustrates the video encoder 1700 or video encoding apparatus that encodes an omnidirectional video as a bitstream that allows independent decoding of different views.

As illustrated, the video encoder 1700 receives input video signal 1705 from a video source and encodes the signal into bitstream 1795. The video encoder 1700 has several components or modules for encoding the video signal 1705, including a transform module 1710, a quantization module 1711, an inverse transform module 1715, an intra-picture estimation module 1720, an intra-picture prediction module 1725, a motion compensation module 1730, a motion estimation module 1735, an in-loop filter 1745, a reconstructed picture buffer 1750, a MV buffer 1765, and a MV prediction module 1775, and an entropy encoder 1790.

In some embodiments, the modules 1710-1790 are modules of software instructions being executed by one or more processing units (e.g., a processor) of a computing device or electronic apparatus. In some embodiments, the modules 1710-1790 are modules of hardware circuits implemented by one or more integrated circuits (ICs) of an electronic apparatus. Though the modules 1710-1790 are illustrated as being separate modules, some of the modules can be combined into a single module.

The video source 1705 provides a raw video signal that presents pixel data of each video frame without compression. A subtractor 1708 computes the difference between the raw video pixel data of the video source 1705 and the predicted pixel data 1713 from motion compensation 1730 or intra-picture prediction 1725. The transform module 1710 converts the difference (or the residual pixel data) into transform coefficients (e.g., by performing Discrete Cosine Transform, or DCT). The quantizer 1711 quantizes the transform coefficients into quantized data (or quantized transform coefficients) 1712, which is encoded into the bitstream 1795 by the entropy encoder 1790.

The inverse transform module 1715 performs inverse transform on the quantized transform coefficients 1712 and produces reconstructed pixel data (after adding prediction pixel data 1713). In some embodiments, the reconstructed pixel data is temporarily stored in a line buffer (not illustrated) for intra-picture prediction and spatial MV prediction. The reconstructed pixels are filtered by the in-loop filter 1745 and stored in the reconstructed picture buffer 1750. In some embodiments, the reconstructed picture buffer 1750 is a storage external to the video encoder 1700. In some embodiments, the reconstructed picture buffer 1750 is a storage internal to the video encoder 1700.

The intra-picture estimation module 1720 performs intra-prediction based on the reconstructed pixel data to produce intra prediction data. The intra-prediction data is provided to the entropy encoder 1790 to be encoded into bitstream 1795. The intra-prediction data is also used by the intra-picture prediction module 1725 to produce the predicted pixel data 1713.

The motion estimation module 1735 performs inter-prediction by producing MVs to reference pixel data of previously decoded frames stored in the reconstructed picture buffer 1750. These MVs are provided to the motion compensation module 1730 to produce predicted pixel data. These MVs are also necessary for reconstructing video frame at the single-channel decoding system. Instead of encoding the complete actual MVs in the bitstream, the video encoder 1700 uses temporal MV prediction to generate predicted MVs, and the difference between the MVs used for motion compensation and the predicted MVs is encoded as residual motion data and stored in the bitstream 1795 for the single-channel decoding system.

The video encoder 1700 generates the predicted MVs based on reference MVs that were generated for encoding previous video frames, i.e., the motion compensation MVs that were used to perform motion compensation. The video encoder 1700 retrieves reference MVs from previous video frames from the MV buffer 1765. The video encoder 1700 stores the MVs generated for the current video frame in the MV buffer 1765 as reference MVs for generating predicted MVs.

The MV prediction module 1775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1795 by the entropy encoder 1790.

The entropy encoder 1790 encodes various parameters and data into the bitstream 1795 by using entropy encoding techniques such as context-adaptive binary arithmetic coding (CABAC) or Huffman encoding. The entropy encoder 1790 encodes parameters such as quantized transform data and residual motion data into the bitstream.

The in-loop filter 1745 performs filtering or smoothing operations on the reconstructed pixel data to reduce the artifacts of coding, particularly at boundaries of pixel blocks. In some embodiments, the filtering operation performed includes sample adaptive offset (SAO). In some embodiment, the filtering operations include adaptive loop filter (ALF).

Video Decoder

Figure 18:
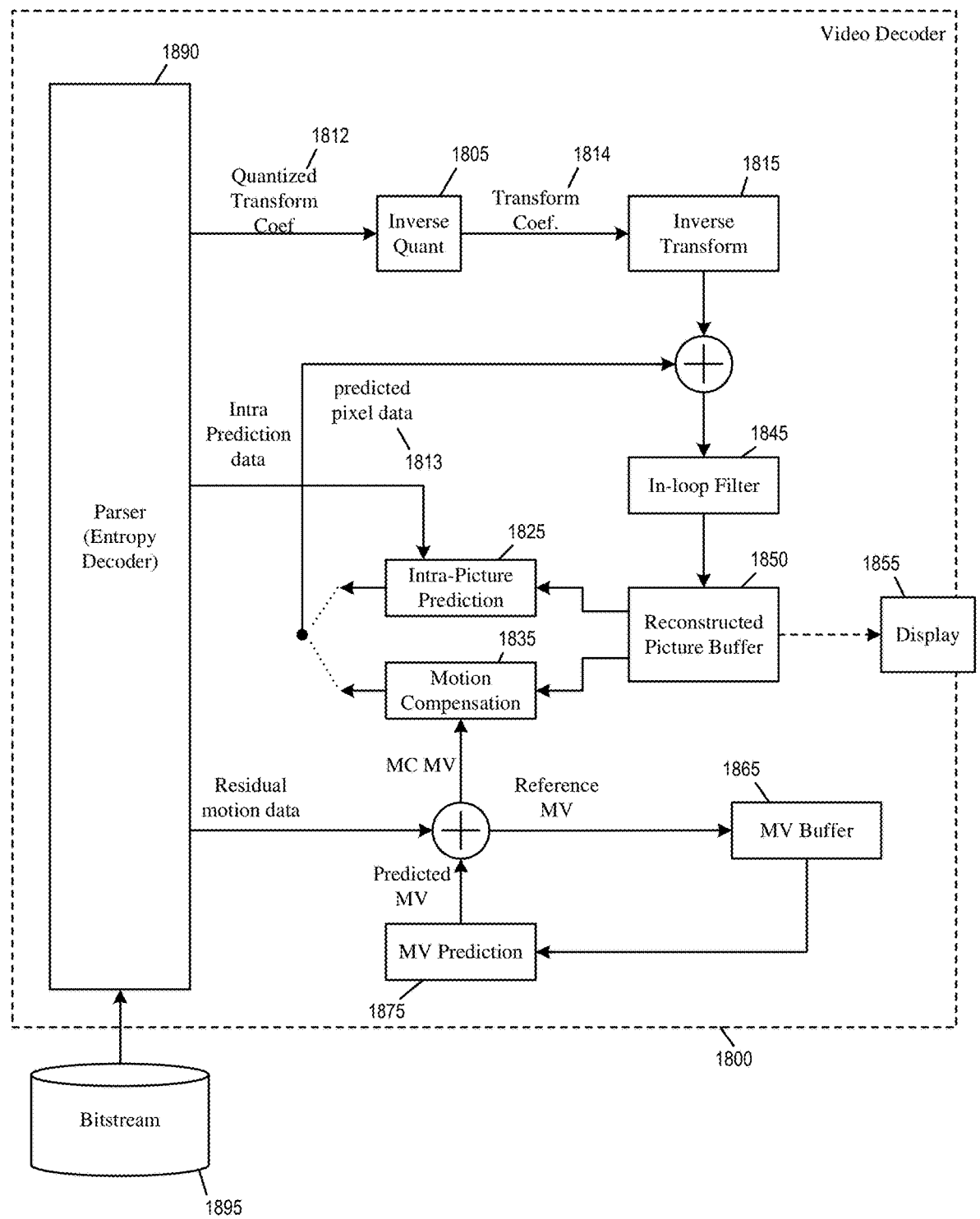
FIG. 18 illustrates the video decoder that performs independent decoding of a selected view in an omnidirectional video.

FIG. 18 illustrates the video decoder 1800 or a video decoding apparatus that performs independent decoding of a selected view in an omnidirectional video. As illustrated, the video decoder 1800 is a video-decoding circuit that receives a bitstream 1895 and decodes the content of the bitstream into pixel data of video frames for display. The video decoder 1800 has several components or modules for decoding the bitstream 1895, including an inverse quantization module 1805, an inverse transform module 1815, an intra-picture prediction module 1825, a motion compensation module 1835, an in-loop filter 1845, a decoded/reconstructed picture buffer 1850, a MV buffer 1865, a MV prediction module 1875, and a bitstream parser (entropy decoder) 1890.

In some embodiments, the modules 1810-1890 are modules of software instructions being executed by one or more processing units (e.g., a processor) of a computing device. In some embodiments, the modules 1810-1890 are modules of hardware circuits implemented by one or more ICs of an electronic apparatus. Though the modules 1810-1890 are illustrated as being separate modules, some of the modules can be combined into a single module.

The parser (entropy decoder) 1890 receives the bitstream 1895 and performs initial parsing according to the syntax defined by a video-coding or image-coding standard. The parsed syntax element includes various header elements, flags, as well as quantized transform coefficients. The parser 1890 parses out the various syntax elements by using entropy-coding techniques such as context-adaptive binary arithmetic coding (CABAC) or Huffman encoding.

The inverse quantization 1805 and inverse transform module 1815 perform inverse quantization and inverse transform on the quantized transform coefficients 1812 and produces reconstructed pixel data (after adding predicted pixel data 1813 from the intra-prediction module 1825 or the motion compensation module 1835). The reconstructed pixel data is stored in the reconstructed picture buffer 1850. The reconstructed pixels data are filtered by the in-loop filter 1845 and stored in the reconstructed picture buffer 1850. In some embodiments, the reconstructed picture buffer 1850 is a storage external to the video decoder 1800. In some embodiments, the reconstructed picture buffer 1850 is a storage internal to the video encoder 1800.

The intra-picture prediction module 1825 receives intra-prediction data from bitstream 1895 and according to which, produces the predicted pixel data 1813 from the reconstructed pixel data stored in the reconstructed picture buffer 1850. In some embodiments, the reconstructed pixel data is also stored in a line buffer (not illustrated) for intra-picture prediction and spatial MV prediction.

In some embodiments, the content of the decoded/reconstructed picture buffer 1850 is used for display. A display device 1855 either retrieves the content of the decoded/reconstructed picture buffer 1850 for display directly, or retrieves the content of the decoded picture buffer to a display buffer. In some embodiments, the display device receives pixel values from the decoded picture buffer through a pixel transport.

The motion compensation module 1835 produces predicted pixel data 1813 from the decoded pixel data stored in the decoded/reconstructed picture buffer 1850 according to motion compensation MVs (MC MVs). These motion compensation MVs are reconstructed by adding the residual motion data received from the bitstream 1895 with predicted MVs received from the MV prediction module 1875.

The video decoder 1800 generates the predicted MVs based on reference MVs that were generated for decoding previously video frames, i.e., the motion compensation MVs that were used to perform motion compensation. The video decoder 1800 retrieves the reference MVs of previous video frames from the MV buffer 1865. The video decoder 1800 also stores the motion compensation MVs generated for decoding the current video frame in the MV buffer 1865 as reference MVs for producing predicted MVs.

The in-loop filter 1845 performs filtering or smoothing operations on the reconstructed pixel data to reduce the artifacts of coding, particularly at boundaries of pixel blocks. In some embodiments, the filtering operation performed includes sample adaptive offset (SAO). In some embodiment, the filtering operations include adaptive loop filter (ALF).

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

FIG. 19 conceptually illustrates an electronic system 1900 with which some embodiments of the present disclosure are implemented. The electronic system 1900 may be a computer (e.g., a desktop computer, personal computer, tablet computer, etc.), phone, PDA, VR device or any other sort of electronic device. Such an electronic system includes various types of computer readable media and interfaces for various other types of computer readable media. Electronic system 1900 includes a bus 1905, processing unit(s) 1910, a graphics-processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the GPU 1915, the read-only memory 1930, the system memory 1920, and the permanent storage device 1935.

From these various memory units, the processing unit(s) 1910 retrieves instructions to execute and data to process in order to execute the processes of the present disclosure. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the present disclosure use a mass-storage device (such as a magnetic or optical disk and its corresponding disk drive) as the permanent storage device 1935.

Other embodiments use a removable storage device (such as a floppy disk, flash memory device, etc., and its corresponding disk drive) as the permanent storage device. Like the permanent storage device 1935, the system memory 1920 is a read-and-write memory device. However, unlike storage device 1935, the system memory 1920 is a volatile read-and-write memory, such a random-access memory. The system memory 1920 stores some of the instructions and data that the processor needs at runtime. In some embodiments, processes in accordance with the present disclosure are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 14-16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   receiving a bitstream comprising an encoded sequence of omnidirectional images, each omnidirectional image having a plurality of views, each view having a set of view-specific data for decoding the view;
   receiving a selection of a view from the plurality of views of one of the omnidirectional images in the sequence;
   for the one of the omnidirectional images in the sequence, decoding the set of view-specific data of the selected view of the one of the omnidirectional images and also decoding a part of at least a first other view of the plurality of views of the one of the omnidirectional images that is adjacent to the selected view without decoding at least a second other view of the plurality of views of the one of the omnidirectional images that is not adjacent to the selected view; and
   providing the selected view of the omnidirectional image based on the decoded set of view-specific data for display.

2. The method of claim 1, wherein each view of the plurality of views is coded as a set of slices or a set of tiles.

3. The method of claim 1, wherein the set of view-specific data of each view is independently entropy encoded, wherein encoding a set of view-specific data of a view comprises resetting an entropy coding state.

4. The method of claim 1, wherein the set of view-specific data of the selected view has no dependency to view-specific data of another view.

5. The method of claim 1, wherein the set of view-specific data of the selected view comprises a referential element associated with a pixel block that references data outside of the pixel block, the method further comprising modifying the referential element when the referential element references data outside of the view, wherein the modified referential element references data within the view.

6. The method of claim 5, wherein the referential element is selected from a list of candidates comprising motion vectors associated with neighboring pixel blocks.

7. The method of claim 1 further comprising:
   when the omnidirectional image is a base layer picture in a prediction hierarchy:
      decoding view-specific data of all views of the omnidirectional image; and
      allowing a selection of a different view.

8. An electronic apparatus comprising:
   a video decoding circuit capable of:
      receiving a bitstream comprising an encoded sequence of omnidirectional images, each omnidirectional image having a plurality of views, each view having a set of view-specific data for decoding the view;
      receiving a selection of a view from the plurality of views of one of the omnidirectional images in the sequence;
      for the one of the omnidirectional images in the sequence, decoding the set of view-specific data of the selected view of the one of the omnidirectional images and also decoding a part of at least a first other view of the plurality of views of the one of the omnidirectional images that is adjacent to the selected view without decoding at least a second other view of the plurality of views of the one of the omnidirectional images that is not adjacent to the selected view; and displaying the selected view of the omnidirectional image based on the decoded set of view-specific data; and a user interface circuit capable of providing the selection of the view.

9. The electronic apparatus of claim 8, wherein the set of view-specific data of the selected view comprises a referential element associated with a pixel block that references data outside of the pixel block, the method further comprising modifying the referential element when the referential element references data outside of the view, wherein the modified referential element references data within the view.

10. The electronic apparatus of claim 8, wherein the video decoder circuit is further capable of:

when the omnidirectional image is a base layer picture in a prediction hierarchy:

decoding view-specific data of all views of the omnidirectional image; and allowing a selection of a different view.

* * * * *